(12) United States Patent (10) Patent No.: US 12,036,716 B2
Wang et al. (45) Date of Patent: Jul. 16, 2024

(54) ORIENTED MULTILAYER POLYETHYLENE FILMS AND LAMINATES THEREOF

(71) Applicant: ExxonMobil Chemical Patents Inc., Baytown, TX (US)

(72) Inventors: XiRui Wang, Shanghai (CN); Etienne R. H. Lernoux, Longueville (BE); Arash Sarhangi Fard, Herent (BE); Chiao Kiat Pey, Singapore (SG)

(73) Assignee: ExxonMobil Chemical Patents Inc., Baytown, TX (US)

( * ) Notice: Subject to any disclaimer, the term of this patent is extended or adjusted under 35 U.S.C. 154(b) by 343 days.

(21) Appl. No.: 17/310,081

(22) PCT Filed: Jan. 23, 2020

(86) PCT No.: PCT/US2020/014794
§ 371 (c)(1),
(2) Date: Jul. 15, 2021

(87) PCT Pub. No.: WO2020/167441
PCT Pub. Date: Aug. 20, 2020

(65) Prior Publication Data
US 2022/0152906 A1 May 19, 2022

Related U.S. Application Data

(60) Provisional application No. 62/804,821, filed on Feb. 13, 2019.

(51) Int. Cl.
*B29C 48/18* (2019.01)
*B29C 48/00* (2019.01)
(Continued)

(52) U.S. Cl.
CPC .......... *B29C 48/18* (2019.02); *B29C 48/0018* (2019.02); *B29C 55/04* (2013.01);
(Continued)

(58) Field of Classification Search
CPC ..... B29C 48/18; B29C 48/0018; B29C 55/04; B29K 2023/065; B29K 2023/08;
(Continued)

(56) References Cited

U.S. PATENT DOCUMENTS

2011/0027511 A1 2/2011 Kuriu et al.
2018/0104942 A1 4/2018 Shen et al.
(Continued)

FOREIGN PATENT DOCUMENTS

WO 2020068497 4/2020

*Primary Examiner* — Nahida Sultana
*Assistant Examiner* — Lawrence D. Hohenbrink, Jr.
(74) *Attorney, Agent, or Firm* — ExxonMobil Technology and Engineering Company-Chemicals

(57) ABSTRACT

The present disclosure provides oriented multilayer films including a first layer, a second layer disposed on the first layer and a third layer disposed on the second layer, where the first layer and the third layer include a polyethylene independently selected from (i) a polyethylene having a density of about 0.94 g/cc or greater; (ii) a polyethylene copolymer including ethylene and a $C_4$-$C_{12}$ alpha-olefin and having a density 7 from about 0.927 g/cc to about 0.95 g/cc; or (iii) a mixture thereof, and at least one of the first layer or the third layer includes the polyethylene copolymer, the second layer includes a polyethylene composition having a density of about 0.91 g/cc or greater and the oriented multilayer film has a haze of about 10% or less and a 1% secant modulus in the direction of stretching of about 500 MPa or greater.

20 Claims, 1 Drawing Sheet

(51) Int. Cl.
*B29C 55/04* (2006.01)
*B29K 23/00* (2006.01)
*B32B 27/06* (2006.01)
*B32B 27/08* (2006.01)
*B32B 27/32* (2006.01)

(52) U.S. Cl.
CPC .... *B29K 2023/065* (2013.01); *B29K 2023/08* (2013.01); *B29K 2995/0022* (2013.01); *B29K 2995/0051* (2013.01); *B29K 2995/0077* (2013.01); *B29K 2995/0081* (2013.01); *B29K 2995/0089* (2013.01); *B29K 2995/0097* (2013.01); *B32B 27/06* (2013.01); *B32B 27/08* (2013.01); *B32B 27/32* (2013.01); *B32B 2307/412* (2013.01); *B32B 2307/50* (2013.01); *B32B 2307/514* (2013.01); *B32B 2307/72* (2013.01); *B32B 2307/7244* (2013.01); *B32B 2307/7246* (2013.01)

(58) Field of Classification Search
CPC .... B29K 2995/0022; B29K 2995/0051; B29K 2995/0077; B29K 2995/0081; B29K 2995/0089; B29K 2995/0097; B32B 27/06; B32B 27/08; B32B 27/32; B32B 2307/412; B32B 2307/7244; B32B 2307/7246; B32B 2307/72; B32B 2307/514; B32B 2307/50
USPC .................................................... 264/173.15
See application file for complete search history.

(56) References Cited

U.S. PATENT DOCUMENTS

2018/0370202 A1* 12/2018 Niedersüss ............ B32B 27/08
2020/0061984 A1    2/2020  Mishra et al.
2020/0346440 A1   11/2020  Pey

* cited by examiner

* DROP TEST PERFORMANCE METHOD B

ORIENTED MULTILAYER POLYETHYLENE FILMS AND LAMINATES THEREOF

CROSS-REFERENCE OF RELATED APPLICATIONS

This application is a National Phase Application claiming priority to PCT Application Serial No. PCT/US2020/014794, filed Jan. 23, 2019, which claims the benefit of U.S. Provisional Application Ser. No. 62/804,821, filed Feb. 13, 2019, and entitled "Oriented Multilayer Polyethylene Films and Laminates Thereof," the disclosures of which are hereby incorporated by reference in their entireties.

FIELD OF THE INVENTION

The present disclosure relates to films and laminates, and in particular, to multilayer films and laminates including polyethylene, and methods for making such films and laminates.

BACKGROUND

Polymer films and laminates thereof have found utility in a wide variety of packaging and other applications. The polymer films and laminates used in packaging are generally transparent multilayer films comprised of two or more polymers which generally include polyethylene (PE), polypropylene (PP), ethylene vinyl alcohol (EVA), polyethylene terephthalate (PET), polyamides (Nylons) and other similar polymers. In recent years consumers have increased their focus on sustainability and recycling of these packaging materials. Currently many of the packaging films on the market are made by combining PE layers and layers made from materials like PET or Nylons to provide the desirable physical properties. Many of these composite materials cannot be recycled in a single collection stream.

There is a current trend to provide materials that are substantially all PE because multilayer films and laminates based in a single class of resin are more easily recycled in a single collection stream. A PE film is often seen as a mandatory component of a laminate as it provides excellent seal strength and hermetic sealing. This implies that the other films integrated in the laminate structure are also made of polyethylene. Ideally the laminate would be fully recyclable without sacrificing the physical properties most desired in packaging or other applications.

Multilayer film properties can be dependent on the combined effect of the coextrusion process conditions, polymer compositions, and post-extrusion processing or stretching. In order to address requirements of particular end-uses, film producers balance mechanical properties such as stiffness and impact strength to make stronger films for a given thickness and optical properties such as clarity, haze, and gloss which impact the attractiveness of the packaging and visual inspection of the goods at the point of sale. Also, because the margins on many packaging products can be narrow, the cost of the packaging material is ideally kept to a minimum. Therefore, thinner films are often desirable because fewer raw materials are used and the cost per item decreases. However, the downgauging (making thinner) of polymer films is typically associated with a loss of stiffness and therefore a loss of utility in packaging.

One way to produce an effective polyethylene multilayer film for the outside of a laminate is by directional orientation (or stretching or drawing or directionally orienting or orienting) process. Directional orientation is a post-extrusion process in which an extruded film is heated to a temperature below the melting point ($T_m$) and stretched in a particular direction. Generally this is in the machine direction (MD) or perpendicular to the machine direction, the transverse direction (TD). The directional orientation process has been shown to improve film properties including modulus, barrier, tensile strength, and optics. Certain properties are directional in nature and are measured in the direction of stretching (DS), which could be in the MD or TD.

One method to produce a mono-oriented multilayer film for packaging is to produce a bubble through the blown process, flatten the bubble, heat up the flattened bubble to a temperature lower than the melting point of the skins, orient it the machine direction, anneal it, separate the 2 parts of the bubble after orientation and wind the two resulting oriented multilayer films separately. Orienting in a single direction gives the oriented multilayer film very high resistance to elongation in the same direction, which is beneficial to certain downstream converting steps including printing, lamination, and packaging.

However, it has been viewed as a difficulty by film manufacturers of various applications to develop an oriented multilayer film comprised substantially of polyethylene for this and similar processes. In particular, reaching good optical and physical properties while avoiding blocking or in other words, keeping the ability to separate the two parts of the flattened bubble, has been a challenge. There is, therefore, a need to further improve multilayer film formulations to provide desired physical and optical properties, while also avoiding blocking during orientation.

SUMMARY

The present disclosure provides oriented multilayer films including a first layer, a second layer disposed on the first layer and a third layer disposed on the second layer, where the first layer and the third layer include a polyethylene independently selected from (i) a polyethylene having a density of about 0.94 g/cc or greater; (ii) a polyethylene copolymer including ethylene and $C_4$-$C_{12}$ alpha-olefin and having a density from about 0.927 g/cc to about 0.95 g/cc; or (iii) a mixture thereof. At least one of the first layer or the third layer includes the polyethylene copolymer. The second layer includes a polyethylene composition having a density of about 0.91 g/cc or greater. The multilayer film has a haze of about 10% or less and a1% secant modulus in the direction of stretching of about 500 MPa or greater.

The present disclosure also provides laminates including an oriented multilayer film and a sealant film, the sealant film including one or more layers of a polyethylene.

The present disclosure also provides methods for preparing an oriented multilayer film including extruding a first layer; a second layer disposed on the first layer; and a third layer disposed on the second layer, where the first layer and the third layer, include a polyethylene independently selected from (i) a polyethylene having a density greater than about 0.94 g/cc; (ii) a polyethylene copolymer including ethylene and $C_4$-$C_{12}$ alpha-olefin having a density from about 0.927 g/cc to about 0.95 g/cc; or (iii) a mixture thereof, where at least one of the first layer or the third layer includes the polyethylene copolymer including ethylene and a $C_4$-$C_{12}$ alpha-olefin having a density from about 0.927 g/cc to about 0.95 g/cc, where in the second layer includes a polyethylene composition having a density of about 0.91 g/cc or greater; and stretching the multi layer film in a uniaxial direction.

DETAILED DESCRIPTION

Figure 1:
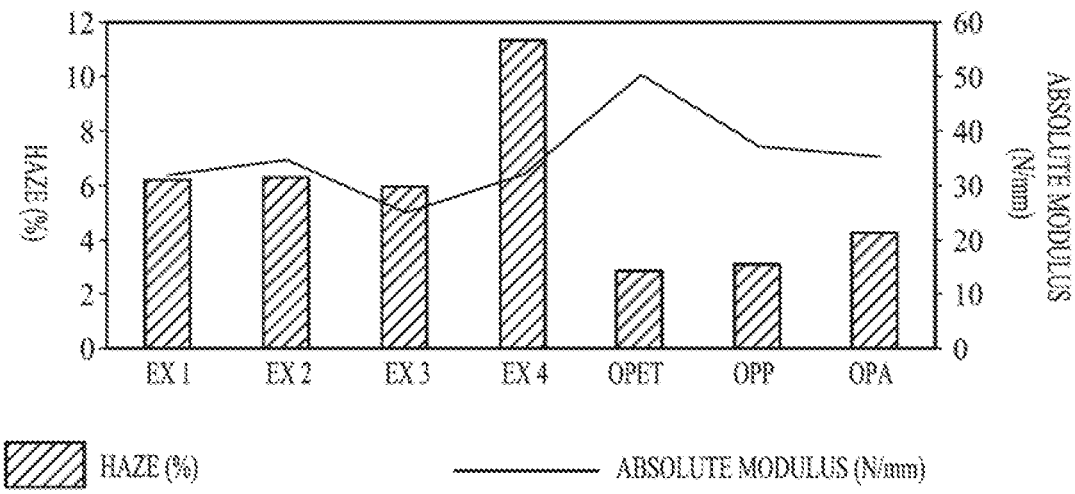
FIG. 1 is a graph comparing the percent haze and absolute modulus of various oriented multilayer films, according to one embodiment.

The present disclosure fulfils the need for polymer films based on a single polymer type without sacrificing desired physical properties and overall film performance. It has been discovered that a multilayer film comprised substantially of polyethylene with desired physical properties can be achieved by addition of an ethylene: $C_4$-$C_{12}$ alpha-olefin (EAO) copolymer either as a co-extrudant in a given layer or as a separate layer in a multilayer blown film that undergoes directional orientation. The addition of EAO copolymers in conjunction with directional orientation can demonstrate advantages in optical and mechanical properties over films that are not oriented or where EAO copolymers are not used. The multilayer films may be laminated to a sealant film forming a laminate with desired physical properties while maintaining the optical properties of the stretched multilayer film. The sealant film may be substantially polyethylene, and an added benefit is that multilayer films and laminates composed substantially from polyethylene and polyethylene copolymers are recyclable in a single collection stream.

It has also been discovered that the use of multilayer films of at least three layers can facilitate selective improvement on desired properties and fine-tuning of property profiles by conveniently adjusting layer distribution and density balance between layers, modifying the relationship between the "stiffest" layer or layers, e.g. the one or ones with the highest density in the film, and other layers in the film. Accordingly, an improved balance between antagonistic mechanical properties, e.g., stiffness-related and toughness-related properties, as well as between mechanical and optical properties, can provide enhanced overall film performance. Multilayer films made substantially from polyethylene containing EAO copolymers in an outer layer offer a promising alternative to non-polyethylene films, and multilayer films containing layers made from polyethylenes mixed with other polyolefins for future development in the coextruded multilayer film and laminates industry and allow film manufacturers to enhance overall film performance by adjusting EAO copolymer distribution between different layers of a multilayer film, a sealant film, and a laminate of the two.

Blocking can occur when a bubble in a blown film process is collapsed, directionally oriented, and opposing sides bond to one another, hampering or preventing the separation of the parts of the bubble afterwards. In order to compensate for blocking issues during directional orientation, it is common in blown extrusion processes for the multilayer film to have a higher density polymer on the interior of the bubble or for the opposing layers to have an anti-blocking additive.

The present disclosure demonstrates that use of certain EAO copolymers, including ethylene:hexene (EH) copolymers in the inside layers of a blown film bubble can reduce or eliminate blocking during the orientation process. The addition of EAO copolymers reduces or eliminates bonding between the opposing sides of the collapsed bubble during orientation without damaging the balance between physical and optical properties in a multilayer film. Therefore, a multilayer film containing EAO copolymers in the inside layer of a blown film bubble offers a promising alternative for future development in the coextruded multilayer film industry, allowing the film manufacturer to enhance overall film performance achievable by adjusting copolymer or polyethylene blend distribution between different layers:

Definitions

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," "polyethylene component" and "ethylene based polymer" mean a polymer or copolymer including about 50 mol % or more ethylene units, about 60 mol % or more ethylene units, about 70 mol % or more ethylene units, about 80 mol % or more ethylene units, about 90 mol % or more ethylene units, about 95 mol % or more ethylene units, or about 100 mol % (in the case of a homopolymer). Furthermore, the term "polyethylene composition" means a composition containing one or more polyethylene components.

As used herein, when a polymer is referred to as including a monomer, the monomer is present in the polymer in the polymerized form of the monomer or in the derivative form of the monomer.

As used herein, when a polymer is said to include a certain percentage, e.g., wt %, of a monomer, that percentage of monomer is based on the total weight amount of monomer units in the polymer.

For purposes of this disclosure, an ethylene polymer having a density of 0.910 to 0.940 g/cm$^3$ is referred to as a "low density polyethylene" (LDPE); an ethylene polymer having a density of 0.890 to 0.940 g/cm$^3$, typically from 0.915 to 0.930 g/cm$^3$, that is linear and does not contain a substantial amount of long-chain branching is referred to as "linear low density polyethylene" (LLDPE) and can be produced with Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g'vis of 0.95 or above, 0.97 or above); and an ethylene polymer having a density of more than 0.940 g/cm$^3$ is referred to as a "high density polyethylene" (HDPE).

As used herein, "first" layer, "second" layer, "third" layer, "fourth" layer, and "fifth" layer are merely identifiers used for convenience, and shall not be construed as limitation on individual layers, their relative positions, or the multi-layer structure, unless otherwise specified herein.

"Disposed on" may mean disposed directly on or disposed indirectly on, unless otherwise specified.

As used herein, stretch ratio in a uniaxial direction is the ratio of a film dimension before stretching to that film dimension after stretching in said uniaxial direction. This is stated, for example, as a stretch ratio of 4; where 4 represents the film length after stretching relative to a film of unit length before stretching, e.g., the film has been stretched to 4 times the original length. Orientation refers to the alignment of polymer chains in the film.

As used herein, "drop test performance method A" refers to the capability of a vertical form fill and seal pillow pouch with 2.5 kg POLYWHITE 8860 masterbatch (bulk density ⅓ g/cm$^3$) to withstand the sudden shock resulting from a free fall in accordance with ASTM D 5276-9. The test is conducted with 20 pouch samples for each formulation, which are dropped with the pouch horizontal with respect to the ground. All pouches are dropped from increasing heights until they burst. The dropping heights are one meter (first drop), two meters (second drop), three meters (third drop), and finally, four meters (fourth drop). The number of pouches surviving each dropping height is recorded for each film formulation. The drop test performance is calculated from the non-breakage fraction at each height according to the following formula:

$$R=(R_1\times 1\times R_2\times 2+R_3\times 3+R_4\times 4)/(1+2+3+4)\times 100\%;$$

where R is non-breakage rate; $R_1$, $R_2$, $R_3$ and $R_4$ are non-breakage fractions in the $1^{st}$, $2^{nd}$, $3^{rd}$ and $4^{th}$ drop, respectively.

As used herein, "drop test performance method B" refers to the capability of a stand-up pouch filled with 650 milliliters of water to withstand the sudden shock resulting from a free fall in accordance with ASTM D 5276-9. The test is conducted with 8 pouch samples for each formulation, which are dropped three times. All pouches are dropped from 1.5 meters, first with the bottom of the pouch horizontal to the ground, second with the vertical side horizontal to the ground, and third with the body of the pouch horizontal with respect to the ground. If the stand-up pouch breaks on any side the pouch failed. The drop test performance is calculated as a percentage of pouches that did not fail the drop test.

"As used herein; a "multilayer film" may include an oriented (stretched) or unoriented (unstretched) multilayer film, unless otherwise specified.

Polyethylenes

In one aspect of the present disclosure, a polyethylene that can be used for the multilayer film or the sealant film (of a laminate) made according to a method of the present disclosure is selected from an ethylene homopolymer, an ethylene copolymer, or a composition thereof. Useful copolymers include one or more comonomers in addition to ethylene and can be a random copolymer, a statistical copolymer, a block copolymer, and/or compositions thereof.

Polyethylenes may include those sold by ExxonMobil Chemical Company in Houston Tex., including HDPE, LLDPE, and LDPE; and those sold under the trade names ENABLE™, ENACT™, EXCEED™, ESCORENE™, EXXCO™, ESCOR™, PAXON™, and OPTEMA™ (ExxonMobil Chemical Company, Houston, Texas, USA); DOW™, DOWLEX™, ELITE™, AFFINITY™, ENGAGE™, and FLEXOMER™ (The Dow Chemical Company, Midland, Michigan, USA); BORSTAR™ and QUEO™ (Borealis AG, Vienna, Austria); and TAFMER™ (Mitsui Chemicals Inc., Tokyo, Japan).

Example LLDPEs include linear low density polyethylenes having a comonomer content from about 0.5 wt % to about 20 wt %, the comonomer derived from $C_3$ to $C_{20}$ α-olefins, e.g. 1-butene or 1-hexene. In various embodiments, the density of LLDPEs are from 0.89 g/cm$^3$ to 0.94 g/cm$^3$, such as from about 0.91 g/cm$^3$ to about 0.93 g/cm$^3$, or from about 0.912 g/cm$^3$ to about 0.925 g/cm$^3$. The MI of such LLDPEs can be about 0.1 g/10 min; about 0.2 g/10 min, or about 0.4 g/10 min to about 4 g/10 min, about 6 g/10 min, or about 10 g/10 min. LLDPEs are distinct from LDPEs which are polymerized by free radical initiation and which contain a high amount of long chain branching resulting from backbiting reaction mechanisms that do not occur in catalytic polymerization as used for LLDPE which favors chain end incorporation of monomers. In at least one embodiment, the LLDPEs are made using a single site (often metallocene) catalyst, in a gas phase or solution process. The use of a single site catalyst, even if supported on a catalyst support, such as silica, can lead to improved homogeneity of the polymer, such as an MWD from about 2 to about 4. In another embodiment, the LLDPEs are made using multi-site titanium based Ziegler Natta catalysts, in a gas phase or solution process. Generally LLDPE made from Zeigler Natta catalysts can be considered as having a broad compositional distribution with a CDBI of less than 50%. LLDPEs may have an MWD determined according to the procedure disclosed herein of about 5 or less. In another embodiment, a layer may contain more than one type of LLDPE.

Example LDPEs include ethylene based polymers produced by free radical initiation at high pressure in a tubular or autoclave reactor. The LDPEs have a medium to broad MWD determined according to the procedure disclosed herein of about 4 or greater, or from about 5 to about 40, and a high level of long chain branching as well as some short chain branching. The density is generally about 0.91 g/cm$^3$ or greater, such as from about 0.92 g/cm$^3$ to about 0.94 g/cm$^3$. The MI may be about 0.55 g/10 min or less or about 0.45 g/10 min or less. In the present disclosure, a layer may contain more than one type of LDPE.

Example HDPEs include high density polyethylenes having a comonomer content from about 0.01 wt % to about 5 wt %, the comonomer derived from $C_3$ to $C_{20}$ α-olefins, e.g. 1-butene or 1-hexene, and in certain embodiments is a homopolymer of ethylene. In various embodiments, the density of HDPEs are from 0.94 g/cm$^3$ to 0.97 g/cm$^3$, such as from about 0.945 g/cm$^3$ to about 0.965 g/cm$^3$, or from about 0.95 g/cm$^3$ to about 0.965 g/cm$^3$. The MI of such HDPEs is from about 0.1 g/10 min, 0.2 g/10 min, or 0.4 g/10 min to about 4 g/10 min, 6 g/10 min, or 10 g/10 min. The HDPEs are typically prepared with either Ziegler-Natta or chromium-based catalysts in slurry reactors, gas phase reactors, or solution reactors. In the present disclosure, a layer may contain more than one type of HDPE.

Suitable commercial polymers for an HDPE may include those sold by ExxonMobil Chemical Company in Houston Tex., including HDPE HD and HDPE HTA and those sold under the trade names PAXON™ (ExxonMobil Chemical Company, Houston, Texas, USA); CONTINUUN™, DOW™, DOWLEX™, and UNIVAL™ (The Dow Chemical Company, Midland, Michigan, USA). Commercial HDPE is available with a density range such as 0.94 g/cm$^3$ to 0.963 g/cm$^3$ and melt index ($I_{2.16}$) range such as 0.06 g/10 min. to 33 g/10 min. Other HDPE polymers include:

ExxonMobil™ HDPE HTA 108 resin has an MI of 0.70 g/10 min and density of 0.961 g/cm$^3$, and is commercially available from ExxonMobil Chemical Company, Houston, Texas.

PAXON™ AA60-003 resin has an MI of 0.25 g/10 min and density of 0.963 g/cm$^3$, and is commercially available from ExxonMobil Chemical Company, Houston, Texas.

CONTINUUM™ DA/IDA-1260 resin has an MI of 2.7 g/10 min and density of 0.963 g/cm³, and is commercially available from Dow Chemical Company, Midland, Michigan UNIVAL™ DMDA-6147 resin has an MI of 10 g/10 min and density of 0.948 g/cm³, and is commercially available from Dow Chemical Company, Midland, Michigan.

In at least one embodiment, the polyethylene is an ethylene copolymer, either random or block, of ethylene and one or more comonomers selected from $C_3$ to $C_{20}$ linear, branched or cyclic monomers, often $C_4$ to $C_{12}$ α-olefins. Such polymers may have about 20 wt % or less, about 10 wt % or less, about 5 wt % or less, about 1 wt % or less, such as about 1 wt % to about 20 wt %, about 1 wt % to about 15 wt %, about 1 wt % to about 12.5 wt %, about 1 wt % to about 10 wt %, about 1 wt % to about 7.5 wt %, about 1 wt % to about 5 wt %, about 1 wt % to about 3 wt %, about 0.1 wt % to about 2 wt %, about 0.1 wt % to about 1 wt %, or about 0.5 wt % to about 1 wt % of polymer units derived from one or more comonomers.

In at least one embodiment, the polyethylene includes about 20 mol % or fewer propylene units, about 15 mot % or fewer, about 10 mot % or fewer, about 5 mot % or fewer, or about 0 mol % propylene units.

In some embodiments the comonomer is a $C_4$ to $C_{12}$ linear or branched alpha-olefin, e.g. 1-butene, 1-pentene, 1-hexene, 1-heptene, 1-octene, 1-nonene, 1-decene, 1-dodecene, 4-methyl-1-pentene, 3-methyl-1-pentene, 3,5,5-trimethyl-1-hexene, and 5-ethyl-1-nonene.

In certain embodiments, aromatic-group-containing monomers contain up to 30 carbon atoms. Suitable aromatic-group-containing monomers include at least one aromatic structure, from one to three aromatic structures, or a phenyl, indenyl, fluorenyl, or naphthyl moiety. The aromatic-group-containing monomer further includes at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. In some embodiments, aromatic-group-containing monomers contain at least one aromatic structure appended to a polymerizable olefinic moiety. Examples of aromatic monomers include styrene, alpha-methylstyrene, para-alkylstyrenes, vinyltoluenes, vinylnaphthalene, allyl benzene, and indene, other examples include styrene, paramethyl styrene, 4-phenyl-1-butene and allyl benzene.

Diolefin monomers may include any hydrocarbon structure, e.g. a $C_4$ to $C_{30}$, having at least two unsaturated bonds, where at least two of the unsaturated bonds are readily incorporated into a polymer by either a stereospecific or a non-stereospecific catalyst(s), The diolefin monomers may be selected from alpha, omega-diene monomers (e.g., di-vinyl monomers). The diolefin monomers may be linear di-vinyl monomers, containing from 4 to 30 carbon atoms. Examples of dimes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, more example dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Example cyclic dienes include cyclopentadiene, vinylnorbornene, norbornadiene, ethylidene norbornene, divinylbenzene, dicyclopentadiene, or higher ring containing diolefins with or without substituents at various ring positions.

In an embodiment, one or more dienes are present in the polyethylene at about 10 wt % or less, such as about 0.00001 wt % to about 2 wt %, about 0.002 wt % to about 1 wt %, about 0.003 wt % to about 0.5 wt %, based upon the total weight of the polyethylene. In some embodiments, diene is added to the polymerization in an amount of from about 50 ppm, 100 ppm, or 150 ppm to about 500 ppm, 400 ppm, or 300 ppm.

Polyethylene copolymers can include at least 50 wt % ethylene and have a $C_3$ to $C_{20}$ comonomer, $C_4$ to $C_{12}$ comonomer, 1-hexene or 1-octene comonomer wt % of about 50 wt % or less, about 10 wt % or less, or about 1 wt % or less, such as about 1 wt % to about 30 wt %, about 1 wt % to about 5 wt %, based upon the weight of the copolymer.

A polyethylene may include from about 70 mol % to about 100 mol % of units derived from ethylene. The lower value of ethylene content may be from about 70 mol %, about 75 mol %, about 80 mol %, about 85 mol %, about 90 mol %, about 92 mol %, about 94 mol %, about 95 mol %, about 96 mol %, about 97 mol %, about 98 mol %, about or 99 mol % based on the mol % of polymer units derived from ethylene. The polyethylene may have an upper ethylene value of about 80 mol %, about 85 mol %, about 90 mol %, about 92 mol %, about 94 mol %, about 95 mol %, about 96 mol %, about 97 mol %, about 98 mol %, about 99 mol %, about 99.5 mol %, about 99.9 mol % or about 100 mol %, based on polymer units derived from ethylene. For polyethylene copolymers, the polyethylene copolymer may have about 50 mol % or less of polymer units derived from a comonomer. e.g. $C_3$-$C_{20}$ olefins or alpha-olefins. The lower value of comonomer content may be about 25 mol %, about 20 mol %, about 15 mol %, about 10 mol %, about 8 mol %, about 6 mol %, about 5 mol %, about 4 mol %, about 3 mol %, about 2 mol %, about 1 mol %, about 0.5 mol % or about 0.1 mol %, based on polymer units derived from the comonomer. The upper value of comonomer content may be about 30 mol %, about 25 mol %, about 20 mol %, about 15 mol %, about 10 mol %, about 8 mol %, about 6 mol %, about 5 mol %, about 4 mol %, about 3 mol %, about 2 mol %, or about 1 mol %, based on polymer units derived from the comonomer olefin. Any of the lower values may be combined with any of the upper values to form a range. Comonomer content is based on the total content of all monomers in the polymer.

Polyethylene Properties

Polyethylene homopolymers and copolymers can have one or more of the following properties:

(a) a weight average molecular weight (Mw) of about 15,000 g/mol or more, from about 15,000 to about 2,000,000 g/mol, from about 20,000 to about 1,000,000 g/mol, from about 25,000 to about 800,000 g/mol, from about 30,000 to about 750,000 g/mol, from about 150,000 to about 400,000 g/mol, from about 200,000 to about 350,000 g/mol as measured by size exclusion chromatography;

(b) a z-average molecular weight (Mz) to weight average molecular weight (Mw) (Mz/Mw) ratio about 1.5 or greater, about 1.7 or greater, or about 2 or greater. In some embodiments, this ratio is from about 1.7 to about 3.5, from about 2 to about 3, or from about 2.2 to about 3 where the Mz was measured by sedimentation in an analytical ultra-centrifuge;

(c) a $T_m$ of about 30° C. to about 150° C., about 30° C. to about 140° C., about 50° C. to about 140° C., or about 60° C. to about 135° C. as determined based on ASTM D3418-03;

(d) a crystallinity of about 5% to about 80%, about 10% to about 70%, about 20% to about 60%, about 30% or greater, about 40% or greater, or about 50% or greater, as determined based on ASTM D3418-03;

(e) a percent amorphous content of from about 40%, about 50%, about 60%, or about 70% to about 95%, about 70%, about 60%, or about 50% as determined by subtracting the percent crystallinity from 100;

(f) a heat of fusion of about 300 J/g or less, about 1 J/g to about 260 J/g, about 5 J/g to about 240 J/g, or about 10 J/g to about 200 J/g, as determined based on ASTM D3418-03;

(g) a crystallization temperature (TO of about 15° C. to about 130° C., about 20° C. to about 120° C., about 25° C. to about 110° C., or about 60° C. to about 125° C. as determined based on ASTM D3418-03;

(h) a heat deflection temperature of about 30° C. to about 120° C. about 40° C. to about 100° C. or about 50° C. to about 80° C. as measured based on ASTM D648 on injection molded flexure bars, at 66 psi load (455 kPa);

(i) a shore hardness (D scale) of about 10 or greater, about 20 or greater, about 30 or greater, about 40 or greater, or about 10 or less, or from about 25 to about 75 as measured based on ASTM D 2240;

(j) a density from about 0.9 g/cm³, or greater, about 0.905 g/cm³, about 0.910 g/cm³, about 0.912 g/cm³, about 0.915 g/cm³, about 0.918 g/cm³, about 0.92 g/cm³, about 0.93 g/cm³, or about 094 g/cm³ to about 0.955 g/cm³, about 095 g/cm³, about 0.94 g/cm³, about 0,935 g/cm³, about 0.93 g/cm³, about 0.925 g/cm³, about 0.923 g/cm³, about 0.921 g/cm³, about 0.92 g/cm³, or about 0.918 g/cm³, or a density of about 0.94 g/cm³ or greater as measured in accordance with ASTM D-4703 and ASTM D-1505/ISO 1183;

(k) a melt index (MI or $I_{2.16}$) from about 0.05 g/10 min; about 0.1 g/10 min; about 0.15 g/10 Min, about 0.18 g/10 min, about 0.2 g/10 min, about 0.22 g/10 min, about 0.25 g/10 min, about 0.28 g/10 min, about 0.3 g/10 min, about 0.5 g/10 min, about 0.7 g/10 min, about 1 g/10 min, or about 2 gr/10 min, to about 800 g/10 min, about 100 g/10 min, about 50 g/10 min, about 30 g/10 min; about 15 g/10 min about 10 g/10 min, about 5 g/10 min, about 3 g/10 min; about 2 g/10 min, about 1.5 g/10 min, about 1.2 g/10 min, about 1.1 g/10 min, about 1 g/10 min, about 0.7 g/10 min, about 0.5 g/10 min, about 0.4 gr/10 min, about 0.3 g/10 min, or about 0.2 gr/10 min, or about 0.1 g/10 min, as measured by ASTM D-1238-E (190° C./2.16 kg);

(l) a melt index ratio (MIR) of from about 10 to about 100, from about 15 to about 80, from about 25 to about 60, from about 10 to about 50, from about 30 to about 55, from about 35 to about 50, from about 40 to about 46, from about 16 to about 50, from about 15 to about 45, from about 20 to about 40, from about 20 to about 35, from about 22 to about 38, from about 20 to about 32, from about 25 to about 31, or from about 28 to about 30 as measured by ASTM D-1238-E (190° C./2.16 kg) and (190° C., 21.6 kg) the ratio of ($I_{21.6}$ (190° C., 21.6 kg)/$I_{2.16}$ (190° C., 2.16 kg);

(m) a composition distribution breadth index ("CDBI") of about 100% or less, about 90% or less, about 85% or less, about 75% or less, about 5% to about 85%, or about 10% to 75%. The CDBI may be determined using techniques for isolating individual fractions of a sample of the resin, most commonly Temperature Rising Elution Fraction ("TREF"); as described in Wild, et al., J. Poly. Sci., Poly. Phys. Ed., Vol. 20, p. 441 (1982);

(n) a molecular weight distribution (MWD) or (Mw/Mn) of about 40 or less, such as from about 1.5, about 1.8, about 1.9, about 2, about 2.5, about 3, about 4; about 4.4, to about 5.5, about 5, about 4.5, about 4. MWD is measured using a gel permeation chromatograph ("GPC") on a Waters 150 gel permeation chromatograph equipped with a differential refractive index ("DRI") detector and a Chromatix KMX-6 on line light scattering photometer. The system is used at 135° C. with 1,2,4-trichlorobenzene as the mobile phase using Shodex (Showa Denko America, Inc.) polystyrene gel columns 802, 803, 804, and 805. This technique is discussed in "Liquid Chromatography of Polymers and Related Materials III," J. Cazes editor, Marcel Dekker, 1981, p. 207. Polystyrene is used for calibration. No corrections for column spreading are employed; however, data on generally accepted standards, e.g., National Bureau of Standards Polyethylene 1484 and anionically produced hydrogenated polyisoprenes (alternating ethylene-propylene copolymers demonstrate that such corrections on MWD are less than 0.05 units). Mw/Mn is calculated from elution times. The numerical analyses are performed using the commercially available Beckman/CIS customized LALLB software in conjunction with the standard Gel Permeation package. Reference to Mw/Mn implies that the Mw is the value reported using the LALLS detector and Mn is the value reported using the DRI detector described above;

(o) a branching index of about 0.75 or greater, about 0.8 or greater, about 0.85 or greater, about 0.9 or greater, about 0.95 or greater, about 0.97 or greater, about 0.98 or greater, about 0.985 or greater, about 0.99 or greater, about 0.995 or greater, or about 1. Branching Index is an indication of the amount of branching of the polymer and is defined as $$g'=[Rg]^2_{br}[Rg]^2_{lin}.$$

where "Rg" stands for Radius of Gyration and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample; and/or (p) an amount of long chain branching of about 3 long-chain branch/1000 carbon atoms or less, 2 long-chain branch/1000 carbon atoms or less, about 1 long-chain branch/1000 carbon atoms or less, about 0.5 long-chain branch/1000 carbon atoms or less, from about 0.05 to about 0.50 long-chain branch/1000 carbon atoms, Such values are characteristic of a linear structure that is consistent with a branching index (as defined above) of g'vis about 0.75 or greater, about 0.8 or greater, about 0.85 or greater, about 0.9 or greater, about 0.95 or greater, about 0.97 or greater, about 0.98 or greater, about 0,985 or greater, about 0.99 or greater, about 0.995 or greater, or about 1. There are various methods for determining the presence of long-chain branches. For example, long-chain branching can be determined using $^{13}C$ nuclear magnetic resonance (NMR) spectroscopy and to a limited extent; e.g., for ethylene homopolymers and for certain copolymers, and it can be quantified using the method of Randall (*Journal of Macromolecular Science, Rev. Macromol. Chem. Phys.*, C29 (2&3), p. 285-297). Although conventional $^{13}C$ NMR spectroscopy cannot determine the length of a long-chain branch in excess of about six carbon atoms, there are other techniques for quantifying or determining the presence of long-chain branches in ethylene-based polymers, such as ethylene/1-octene interpolymers. For those ethylene-based polymers where the $^{13}C$ resonances of the comonomer overlap completely with the $^{13}C$ resonances of the long-chain branches, either the comonomer or the other monomers (such as ethylene) can be isotopically labelled so that the long-chain branches can be distinguished from the comonomer. For example, a copolymer of ethylene and 1-octene can be prepared using $^{13}C$-labeled ethylene. In this case, the resonances associated with macromer incorporation will be significantly enhanced in intensity and will show coupling to neighboring $^{13}C$ carbons, whereas the octene resonances will be unenhanced.

ADDITIONAL POLYETHYLENE EMBODIMENTS

In at least one embodiment, the polyethylene is a first type of LLDPE (PE1-type) having about 99 wt % to about 80 wt %, about 99 wt % to about 85 wt %, about 99 wt % to about 87.5 wt %, about 99 wt % to about 90 wt %, about 99 wt % to about 92.5 wt %, about 99 wt % to about 95 wt %, or about 99 wt % to about 97 wt %, of polymer units derived from ethylene and about 1 wt % to about 20 wt %, about 1 wt % to about 15 wt %, about 1 wt % to about 12.5 wt %, about 1 wt % to about 10 wt %, about 1 wt % to about 7.5 wt %, about 1 wt % to about 5 wt %, or about 1 wt % to about 3 wt % of polymer units derived from one or more $C_3$ to $C_{20}$ α-olefin comonomers, such as $C_3$ to $C_{12}$ α-olefins, $C_4$ to $C_{12}$ α-olefins, or hexene and octene. The α-olefin comonomer may be linear or branched, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene, 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene.

The PE1-type polyethylene may have a composition distribution breadth index (CDBI) of about 70% or greater, such as about 75% or greater, about 80% or greater, about 82% or greater, about 85% or greater, about 87% or greater, about 90% or greater, about 95% or greater, or about 98% or greater. Additionally or alternatively, the CDBI may be about 100% or less, such as about 98% or less, about 95% or less, about 90% or less, about 87% or less, about 85% or less, about 82% or less, about 80% or less, or about 75% or less. Ranges expressly disclosed include, but are not limited to, ranges formed by combinations any of the above-enumerated values, e.g., about 70% to about 98%, about 80 to about 95%, about 85 to about 90% etc.

A PE1-type polyethylene may have a density about 0.918 g/cm$^3$ or greater, about 0,920 g/cm$^3$ or greater, about 0.922 g/cm$^3$ or greater, about 0.927 g/cmi or greater, about 0,930 g/cm$^3$ or greater, about 0.932 g/cm$^3$ or greater. Additionally, a PE1-type polyethylene may have a density of about 0.945 g/cm$^3$ or less, about 0.940 g/cm$^3$ or less, about 0.937 g/cm$^3$ or less, about 0.935 g/cm$^3$ or less, about 0,933 g/cm$^3$ or less, or about 0.930 g/cm$^3$ or less. Ranges expressly disclosed include, but are not limited to, ranges formed by combinations any of the above-enumerated values, e.g., about 0.920 g/cm$^3$ to about 0.945 g/cm$^3$, about 0.920 g/cm$^3$ to about 0.930 g/cm$^3$, about 0,927 g/cm$^3$ to about 0.95 g/cm$^3$, about 0.927 g/cm$^3$ to about 0.940 g/cm$^3$, etc.

A PE1-type polyethylene can be a metallocene polyethylene (mPE). The PE1-type polyethylene may have a $g'_{vis}$ of from about 0.75 to about 0.98, such as from about 0.75 to about 0.97, about 0.8 to about 0.97, about 0.85 to about 0.97, or about 0.9 to about 0.95.

Suitable commercial polymers for the PE1-type polyethylene are available from ExxonMobil Chemical Company under the tradename Enable™. Polyethylene polymers known as ENABLE™ mPE available from ExxonMobil Chemical Company, Houston, Texas, offer a combination of polymer film processing advantages and higher alpha olefin (HAO) performance. A balance of operational stability, extended output, versatility with HAO performance, and resin sourcing simplicity are among some of the advantageous properties of this family of polyethylene polymers. Commercial ENABLE™ mPE is available with a density range such as 0.920 g/cm$^3$ to 0.940 g/cm$^3$ and melt index ($I_{2.16}$) range such as 0.3 g/10 min. to 1.0 g/10 min, Examples of ENABLE™ polymers include:

Enable™ 2703HH mPE resin has an MI of 0.30 g/10 min and density of 0.927 g/cm$^3$, and is commercially available from ExxonMobil Chemical Company, Houston, Texas.

Enable™ 2705MC mPE resin has an MI of 050 g/10 min and density of 0.927 g/cm$^3$, and is commercially available from ExxonMobil Chemical Company, Houston, Texas.

Enable™ 3505MC mPE resin has an MI of 0.50 g/10 min and density of 0.935 g/cm$^3$, and is commercially available from ExxonMobil Chemical Company, Houston, Texas.

Enable™ 4002MC mPE resin has an MI of 0.25 g/10 min and a density of 0.94 g/cm$^3$, and is commercially available from ExxonMobil Chemical Company, Houston, Texas.

Enable™ 4009MC mPE resin has an MI of 0.9 g/10 min and a density of 0.94 g/cm$^3$, and is commercially available from ExxonMobil Chemical Company, Houston, Texas.

In at least one embodiment, the polyethylene is a second type of LLDPE (PE2-type) polyethylene including about 50 wt % or greater of polymer units derived from ethylene and a $C_3$ to $C_{20}$ alpha-olefin comonomer (e.g. hexene or octene) of about 50 wt % or less, such as about 1 wt % to about 35 wt %, or about 1 wt % to about 6 wt %. PE2-type polyethylenes can have a CDBI of about 60% or greater, such as about 60% to about 80%, or about 65% to about 80%. The PE2-type polyethylene may have a density of about 0.910 g/cm$^3$ to about 0.950 g/cm$^3$, about 0.915 g·cm$^3$ to about 0.940 g/cm$^3$, or about 0.918 g/cm$^3$ to about 0.925 g/cm$^3$. PE2-type polyethylenes may have a melt index ($I_{2.16}$) according to ASTM D1238 (190° C./2.16 kg) of about 0.5 g/10 min to about 5 g/10 min, or about 0.8 g/10 min to about 1.5 g/10 min. A PE2-type polyethylene can be a mPE. Such PE2-type polyethylenes can have a $g'_{vis}$ of about 0.95 or greater, about 0.97 or greater and can be a prepared by gas-phase polymerization supported catalyst with an bridged bis(alkyl-substituted dicyclopentadienyl) zirconium dichloride transition metal component and methyl alumoxane cocatalyst. PE2-type polyethylenes are available from ExxonMobil Chemical Company under the trade name Exceed™ and Exceed™ XP.

Polyethylene polymers known as EXCEED™ and EXCEED™ XP mPE available from ExxonMobil Chemical Company, Houston, Texas, offer a combination of high toughness and outstanding tensile strength. A balance of impact strength, tear strength, flex-crack resistance, and melt-strength are among some of the advantageous properties of this family of polyethylene polymers. Commercial EXCEED™ mPE is available with a density range such as 0.91 g/cm$^3$ to 0.925 g/cm$^3$ and melt index ($I_{2.16}$) range such as 0.2 g/10 min, to 19 g/10 min. Examples of EXCEED™ polymers include:

- Exceed™ XP 8656 metallocene polyethylene (mPE) resin has an MI of 0.5 g/10 min and a density of 0.916 g/cm$^3$, and is commercially available from ExxonMobil Chemical Company, Houston, Texas.
- Exceed™ 1018 metallocene polyethylene (mPE) resin has an MI of 1 g/10 min and a density of 0.918 g/cm$^3$, and is commercially available from ExxonMobil Chemical Company, Houston, Texas.
- Exceed™ XP 8784 metallocene polyethylene (mPE) resin has an MI of 0.8 g/10 min and a density of 0.914 g/cm$^3$, and is commercially available from ExxonMobil Chemical Company, Houston, Texas.
- Exceed™ XP 8318 metallocene polyethylene mPE) resin has an MI of 1.0 g/10 min and a density of 0.918 g/cm$^3$, and is commercially available from ExxonMobil Chemical Company, Houston, Texas.
- Exceed™ 1012HA metallocene polyethylene (mPE) resin has an MI of 1 g/10 min and a density of 0.912 g/cm$^3$, and is commercially available from ExxonMobil Chemical Company, Houston, Texas.
- Exceed™ 2012HA metallocene polyethylene (ran) resin has an MI of 2.0 g/10 min and a density of 0.912 g/cm$^3$, and is commercially available from ExxonMobil Chemical Company, Houston Polyethylene Production The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. Polyethylene homopolymers or copolymers that can be used may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. In an embodiment, the polyethylenes are made by the catalysts, activators and processes described in U.S. Pat. Nos. 5,466.649; 5,741, 563; 6,242,545; 6,248,845; 6,255,426; 6,324,566; 6,384, 142; 6,476,171; and 7,951,873 and WO Publication Nos. 2004/000919, 2004/022646, 2004/022634, 2003/040201 and 1997/19991. Such catalysts are described in, for example, ZIEGLER CATALYSTS (Gerhard Fink, Rolf Mülhaupt and Hans H. Brintzinger, eds., Springer-Verlag 1995 5); Resconi et al.; and I, II METALLOCENE-BASED POLYOLEFINS (Wiley & Sons 2000).

In at least one embodiment of the present disclosure, the polyethylene useful herein is produced by polymerization of ethylene and, optionally, an alpha-olefin with a catalyst having, as a transition metal component, a his (n-$C_{3-4}$ alkyl cyclopentadienyl) hafnium compound, where the transition metal component includes from about 95 mol % to about 99 mol % of the hafnium compound as further described in U.S. Pat. No. 6,956,088.

In another embodiment, the polyethylene is produced by gas-phase polymerization of ethylene with a catalyst having as a transition metal component a bis(n-$C_{3-4}$ alkyl cyclopentadienyl) hafnium compound, where said transition metal component includes from about 95 mol % to about 99 mol % of said hafnium compound.

In a class of embodiments, the polyethylene may contain less than 5 ppm hafnium, less than 2 ppm hafnium, less than 1.5 ppm hafnium, or less than 1 ppm hafnium. In other embodiments, the polyethylene polymers may contain from about 0.01 ppm to about 2 ppm hafnium, from about 0.01 ppm to about 1.5 ppm hafnium, or from about 0.01 ppm to about 1 ppm hafnium.

Typically, the amount of hafnium is greater than the amount of zirconium in the polyethylene polymer. In a class of embodiments, the ratio of hafnium to zirconium (ppm/ppm) is about 2 or more, about 10 or more, about 15 or more, about 17 or more, about 20 or more, about 25 or more, about 50 or more, about 100 or more, about 200 or more, or about 500 or more. While zirconium generally is present as an impurity in hafnium, it will be realized in some embodiments where particularly pure hafnium-containing catalysts are used, the amount of zirconium may be extremely low, resulting in a virtually undetectable or undetectable amount of zirconium in the polyethylene polymer. Thus, the upper value on the ratio of hafnium to zirconium in the polymer may be quite large.

Multilayer Films

The multilayer film includes a first layer, a second layer disposed on the first layer, and a third layer disposed on the second layer. An oriented multilayer film is directionally oriented at a ratio of about 1:3 or greater. Each of the first layer, the second layer, and the third layer includes a polyethylene polymer, optionally mixed with a second or third polyethylene polymer or other polymers or additives.

The multilayer film may have a 1/2/3 structure where 1 and 3 are outer layers and 2 is a central layer disposed between the outer layers. Suitably one or both of the first layer and the third layer can be an outermost layer forming one or both film surfaces. The composition of the polyethylene of the first layer and the polyethylene of the third layer may be the same or different. Either of the polyethylene of the first layer and the polyethylene of the third layer may have a higher or lower density than that of the polyethylene of the second layer. In at least one embodiment, at least one of the polyethylenes of the first layer and the third layer has a density higher than that of the polyethylene of the second layer. In some embodiments, the polyethylene of the first layer and the polyethylene of the third layer have substantially the same chemical composition.

The multilayer film may have a 1/4/2/5/3 structure where 1 and 3 are outer layers and 2 represents a central or core layer and 4 and 5 are inner layers disposed between the central layer and an outer layer. The composition of the polyethylene of the fourth layer and the polyethylene of the fifth layer may also be the same or different. The polyethylene of the first layer and the polyethylene of the third layer may have the same composition or different compositions from the polyethylene of the fourth layer and the poly ethylene of the fifth layer. In at least one embodiment, at least one of the polyethylene of the fourth layer and the polyethylene of the fifth layer has a different composition than that of the polyethylene of the first layer and the polyethylene of the third layer. In another embodiment, the polyethylene of the first layer and the polyethylene of the third layer have substantially the same chemical composition, and the polyethylene of the fourth layer and the polyethylene of the fifth layer have substantially the same chemical composition different from the polyethylene of the first layer and the polyethylene of the third layer. In another embodiment, the polyethylene of the first layer, the polyethylene of the third layer, the polyethylene of the fourth layer and the polyethylene of the fifth layer have substantially the same chemical composition.

In at least one embodiment, a multilayer film includes in at least one layer at least one of LLDPE, LINT and HDPE (as a polyethylene defined herein). In another embodiment, a multilayer film includes in at least one layer 100 wt % of an RAO copolymer, based on total weight of polymer in the layer. In another embodiment, a multilayer film includes in at least one layer 100 wt % of an EH copolymer, based on total weight of polymer in the layer.

In another embodiment, the LLDPE, LIRE, and HDPE present in a Oven layer may be a blend with one or more other polymers, such as polyethylenes defined herein, which blend is referred to as a polyethylene composition, as defined herein. In an embodiment, the polyethylene compositions described may be physical blends or in situ blends of more than one type of polyethylene or compositions of polyethylenes with polymers other than polyethylenes. In some embodiments, the polyethylene composition is a blend of two polyethylenes with different densities.

In another embodiment, the polyethylene composition is an EAO copolymer or blended with a second polyethylene. In at least one embodiment the EAO copolymer is an EH copolymer. The second polyethylene may be a homopolymer or a copolymer different from the EAO copolymer. In an embodiment where the polyethylene composition is a homopolymer:copolymer blend, the polyethylene homopolymer in the blend may be present in an amount of about 50 wt % or less, about 45 wt % or less, about 40 wt % or less, about 35 wt % or less, about 30 wt % or less, about 25 wt % or less, about 20 wt % or less, about 15 wt % or less, about 10 wt % or less, or about 5 wt % or less, based on the total weight of polymer in the polyethylene composition.

In at least one embodiment, a multilayer film includes in each of the first layer and the third layer 100 wt % of an polyethylene copolymer, based on total weight of polymer in the first layer and the third layer. In at least one embodiment, the polyethylene copolymer is an EAO copolymer. In at least one embodiment, the polyethylene copolymer is an EH copolymer. In another embodiment, a multilayer film includes in each of the first layer or the third layer 100 wt % of an HDPE, based on total weight of polymer in the first layer or the third layer. In another embodiment, a multilayer film includes in each of the fourth layer and the fifth layer 100 wt % of an HDPE, based on total weight of polymer in the fourth layer and the fifth layer. In another embodiment, a multilayer film includes in each of the first layer and the third layer 100 wt % of an EAO copolymer, based on total weight of polymer in the first layer and the third layer and in each of the fourth layer and the fifth layer 100 wt % of an HDPE, based on total weight of polymer in the fourth layer and the fifth layer. In at least one embodiment, a multilayer film includes in each of the first layer and the third layer 100 wt % of an EH copolymer, based on total weight of polymer in the first layer and the third layer and in each of the fourth layer and the fifth layer 100 wt % of an HDPE, based on total weight of polymer in the fourth layer and the fifth layer.

In at least one embodiment, a polyethylene in the second layer of the multilayer film includes a polyethylene having a density of about 0.910 to about 095 g/cm$^3$, an MI, I2.16, of about 0.1 to about 15 g/10 min, an MWD of about 1.5 to about 5.5, and an MIR, $I_{21.6}/I_{2.16}$, of about 10 to about 100.

In at least one embodiment, at least one of LLDPE, LDPE, and HDPE is present in the second layer, and the polyethylene present in the first layer and/or the third layer is an EH copolymer.

In at least one embodiment, the multilayer film has a three-layer 1/2/3 structure, including: (a) the first layer and the third layer, each including 100 wt % of an EAO copolymer, based on total weight of polymer in the outer layer, where the EAO copolymer has a density of about 0.927 g/cm$^3$ to about 0.95 g/cm$^3$, an MI ($I_{2.16}$), of about 0.1 g/10 min to about 15 g/10 min, and an MWD of about 1.5 to about 5.5; and (b) a second layer disposed between the two outer layers including at least one of LLDPE, LDPE, and HDPE in an amount of at least about 30 wt %, based on total weight of polymer in the second layer. In at least one embodiment, the EAO copolymer is an EH copolymer.

In at least one embodiment, the multilayer film has a five layer 1/4/2/5/3 structure, including: (a) the first layer and the third layer, each including 100 wt % of an EAO copolymer, where the EAO copolymer has a density of about 0.927 g/cm$^3$ to about 0.945 g/cm$^3$; (b) the fourth and the fifth layer, each including at least one of LLDPE, LDPE, and HDPE in an amount of at least about 30 wt %, based on the total weight of polymer in the second layer, and (c) a second layer disposed between the fourth layer and the fifth layer including 100 wt % of an EAO copolymer, where the EAO copolymer has a density of about 0.910 g/cm$^3$ to about 0.945 g/cm$^3$. In at least one embodiment, the EAO copolymer is an EFT copolymer.

In another embodiment where the multilayer film includes in the fourth layer and the fifth layer at least one of LLDPE. LDPE, and HDPE described herein, the LLDPE, LDPE, HDPE, or any combination thereof may be present in an amount of about 30 wt % or greater, for example, anywhere from about 30 wt %, about 35 wt %, about 40 wt %, about 45 wt %, about 50 wt %, about 55 wt %, about or 60 wt %, to about 70 wt %, about 75 wt %, about 80 wt %, about 85 wt %, about 90 wt %, about 95 wt %, or about 100 wt %, based on the total weight of polymer in the layer. Any of the polyethylenes of the first layer, the third layer, the fourth layer or the fifth layer may have a higher or lower density than the polyethylene of the second layer. In at least one embodiment, at least one of the first layer, the third layer or the second layer has a density lower than that of either or both of the fourth layer or the fifth layer.

The unoriented multilayer films can have a thickness of about 40 μm to about 360 μm, such as about 50 μm to about 300 μm, or about 60 μm to about 200 μm. After stretching, the final thickness of the oriented multilayer films may be from about 5 μm to about 120 μm, such as about 10 μm to about 60 μm, or about 15 μm to about 45 μm. For the three-layer structure, the first layer, the second layer, and the third layer may be of equal thickness or alternatively the second layer may be thicker than each of the first layer and the third layer. In at least one embodiment, a multilayer film includes a first layer and a third layer which each independently form 10% to 35%, or 15% to 30% of the total final thickness of the 3-layered film, the second layer forming the remaining thickness, e.g. 30% to 80%, or 40% to 70% of the total final thickness of the 3-layered film. The total thickness of the film is 100%, thus the sum of the individual layers has to be 100%.

For the multilayer film of 1/4/2/5/3 structure, the individual layers can contribute to the total film thickness of the multilayer film in a variety of ways, for example: 10% to 30%, or 15-25% for each of the first layer and the third layer, 5% to 30%, or 8% to 20% for each of the fourth layer and the fifth layer, and/or 10% to 40%, or 15% to 35% for the second layer.

In some embodiments, the first layer, the third layer, the fourth layer, and the fifth layer are of equal thickness. In some embodiments, the first layer, the second layer, and the third layer are of equal thickness. In at least one embodiment, the second layer, the fourth layer, and the fifth layer are of equal thickness.

The multilayer film may further include additional layer(s), which may be any layer typically included in multilayer films. These additional layers may include barrier coatings that are added before or after stretching. Layers that provide barrier enhancement are a feature of interest in packaging applications. Additional layers may be added through any suitable method including, co-extrusion, extrusion coating, solid sublimation, or solvent or water based coatings. For example, the additional layer(s) which may or may not provide barrier enhancement may be made from:

A. Polyolefins. Polyolefins include homopolymers or copolymers of $C_2$ to $C_{20}$ olefins, e.g. a copolymer of an α-olefin and another olefin or α-olefin (ethylene is defined to be an α-olefin). Some examples of polyolefins include homopolyethylene, homopolypropylene, propylene copolymerized with ethylene and/or butene, ethylene copolymerized with one or more of propylene, butene or hexene, and optional dienes. Other examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

B. Polar polymers. Polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Examples include polyesters, polyamides, ethylene vinyl acetate copolymers, and polyvinyl chloride.

C. Cationic polymers. Cationic polymers include polymers or copolymers of geminally disubstituted olefins, α-heteroatom olefins and/or styrenic monomers. Geminally disubstituted olefins include isobutylene, isopentene, isoheptene, isohexane, isooctene, isodecene, and isododecene. α-Heteroatom olefins include vinyl ether and vinyl carbazole. Styrenic monomers include styrene, alkyl styrene, para-alkyl styrene, α-methyl styrene, chloro-styrene, and bromo-para-methyl styrene. Examples of cationic polymers include butyl rubber, isobutylene copolymerized with para methyl styrene, polystyrene, and poly-α-methyl styrene.

D. Miscellaneous. Other layers can be paper, wood, cardboard, metal, metal foils (such as aluminum foil and tin foil), metallized surfaces, glass (including silicon oxide (SiOx) or aluminum oxide (AlOx) coatings applied by evaporating SiOx or AlOx onto a film surface), fabric, spunbond fibers, and non-wovens (e.g. polypropylene spunbond fibers or non-woven), and substrates coated with inks, dyes, pigments, and the like.

As an example, a multilayer film can also include layers including materials such as ethylene vinyl alcohol (EVOH), polyamide (PA), polyvinylidene chloride (PVDC), or aluminium, so as to alter barrier performance for the film where appropriate.

Multilayer films may be useful for laminating to materials having less elasticity than polyethylene films, such as, biaxially oriented polyester (e.g., polyethylene terephthalate (PET)) films, biaxially oriented polypropylene (BOPP) films, biaxially oriented polyamide (nylon) films, foil, paper, board, or fabric substrates, or may further include one of the above substrate films to form a laminate.

It has been discovered that the combination of (i) use of 100 wt % of EAO copolymer in at least one skin layer (based on total weight of polymer in each layer) of a multilayer film and (ii) stretching or directional orientation of the multilayer film may provide certain advantages to the production of oriented multilayer films including: modifying the balance between optical and mechanical properties of the oriented multilayer film and reducing or eliminating blocking when collapsing a blown film bubble or in a collapsed bubble of a blown unoriented multilayer film during directional orientation. Often HDPE is used in the inside of a polyethylene blown film bubble in order to avoid blocking when collapsing or during directional orientation, but the use of certain EAO copolymers, including certain EH copolymers reduces or eliminates blocking and does not have the drawbacks in optical properties related to the addition of HDPE. For example, at a given overall film stiffness resulting from a predetermined overall film density, optical performance of the multilayer film can be greatly strengthened by concentrating EAO copolymers in the outer layers, while other mechanical properties, can remain at a comparable level or even grow in step with the optical properties, rather than being compromised as normally anticipated. In addition, little to no density difference between the second layer and any outer layer can provide the performance improvement. As a result, the oriented multilayer film can provide a convenient and cost-effective alternative to current options for film packages where well balanced overall film performance is expected. Another advantage to multilayer films made primarily from ethylene is recyclability within a single collection stream. The lamination of polyethylene multilayer films with polyethylene sealant films, as described below, also provides the advantage of recyclability in a single collection stream.

Oriented Multilayer Film Properties

Where applicable, the properties and descriptions below are intended to encompass measurements in both the direction of stretching (DS) and the direction perpendicular to the DS. Such measurements are reported separately, with the designation "DS" indicating a measurement in the direction of stretching, and "PS" indicating a measurement in the direction perpendicular to stretching.

Tensile properties of the films can be measured as specified by ASTM D882 with static weighing and a constant rate of grip separation. Since rectangular shaped test samples can be used, no additional extensometer is used to measure extension. The nominal width of the tested film sample is 15 mm and the initial distance between the grips is 50 mm. A pre-load of 0.1N is used to compensate for the so called TOE region at the origin of the stress-strain curve. The constant rate of separation of the grips is 5 mm/min upon reaching the pre-load, and 5 mm/min to measure 1% Secant modulus (up to 1% strain). The film samples may be tested in direction of stretching (DS) or in a direction perpendicular to stretching (PS).

Oriented multilayer films of the present disclosure may have one or more of the following properties:

(a) A 1% secant modulus in the DS of about 500 MPa. or greater, from about 500 MPa to about 1500 MPa, from about 600 MPa to about 1200 MPa, from about 600 MPa to about 1000 MPa, from about 600 MPa to about 900 MPa, or from about 600 MPa to about 800 MPa, as determined by ASTM D882 where 1% Secant modulus is calculated by drawing a tangent through two well defined points on the stress-strain curve, the reported value corresponds to the stress at 1% strain (with x correction) and generally the 1% secant modulus is used for thin film and sheets as no clear proportionality of stress to strain exists in the initial part of the curve;

(b) An absolute modulus of about 10 N/mm or greater, about 15 N/mm or greater, about 20 N/mm or greater, about 25 N/mm or greater, or about 30 N/mm or greater, where the absolute modulus is calculated by multiplying (i) the 1% secant modulus in the direction of stretching, as determined by ASTM D882 by (ii) the thickness of the multilayer film in millimeters.

(c) A 1% secant modulus in the PS of about 400 MPa or less, about 300 MPa. or less, or about 250 MPa or less. For example, the 1% Secant Modulus perpendicular to the direction of stretching can be from about 70 MPa to about 400 MPa, from about 100 MPa to about 300 MPa, from about 100 MPa to about 275 MPa, from about 100 MPa to about 250 MPa, from about 150 MPa to about 250 MPa, from about 175 MPa to about 250 MPa, from about 150 MPa to about 200 MPa, or from about 200 MPa to about 250 MPa, as determined by ASTM D882;

(d) A total thickness of from about 5 μm to about 120 μm, from about 10 μm to about 60 μm, or from about 15 μm to about 45 μm. The thickness of each of the first layer and the third layer may be at least 5% of the total thickness, or from about 10% to about 40%. The thickness ratio between one of the first layer or the third layer and the second layer may be about 1:1 to about 1:6, for example, about 1:1, about 1:2, about 1:3, or about 1:4;

(e) An Elmendorf Tear Strength (tear resistance) in the direction of stretching of at about 0.3 g/μm or greater, about 0.5 g/μm or greater, about 0.6 g/μm or greater, or about 0.8 g/urn or greater. For example, the Elmendorf Tear strength in the direction of stretching can be from about 0.3 g/μm to about 2.5 g/μm, from about 0.5 g/μm to about 2 g/μm, from about 0.5 g/μm to about 1.5 g/μm, from about 0.6 g/μm to about 1 g/μm, or from about 0.7 g/μm to about 0.9 g/μm, as determined by ASTMD1922-06a, which measures the energy required to continue a pre-cut tear in the test sample, expressed in (glum). Samples were cut across the web using the constant radius tear die and were free of any visible detects e.g., die lines, gels, etc.);

(f) A Haze value of about 45% or less, about 40% or less, about 35% or less, about 30% or less, about 25% or less, about 20% or less, about 15% or less, or about 10% or less, as determined by ASTM D-1003;

(g) A Clarity (defined as regular transmitted light that is deflected less than 0.1 from the axis of incident light through the bulk of the film sample) of about 60% or greater, about 70% or greater, about 75% or greater, about 80% or greater, about 85% or greater, about 90% or greater, about 95% or greater, as determined by ASTM D1746; and/or (h) A Gloss of about 30% or greater, about 40% or greater, about 50% or greater, about 60% or greater, about 70% or greater, about 80% or greater, about 90% or greater, as determined by ASTM D-2457, where a light source is beamed onto the plastic surface at an angle of 45° and the amount of light reflected is measured.

In certain embodiments, the film has at least two, at east three, at least four, or any number of the foregoing properties.

Multilayer Film Production

Also provided are methods for making multilayer films of the present disclosure. A method for making an oriented multilayer film may include: extruding a first layer, a second layer disposed on the first layer, and a third layer disposed on the second layer, where the first layer and the third layer include a polyethylene independently selected from (i) a polyethylene having a density of about 0.94 g/cc or greater; (ii) a polyethylene copolymer including ethylene and a $C_4$-$C_{12}$ alpha-olefin having a density from about 0.927 g/cc to about 0.95 g/cc; or (iii) a mixture thereof, where at least one of the first layer or the third layer includes the polyethylene copolymer, where the second layer includes a polyethylene composition having a density of about 0.91 g/cc or greater; and stretching the multilayer film in a uniaxial direction.

In another embodiment, a method of making a multilayer film further includes: extruding a fourth layer disposed between the first layer and the second layer, where the fourth layer includes a polyethylene.

In another embodiment, a method of making a multilayer film further includes: extruding a fifth layer disposed between the second layer and the third layer, where the fifth layer includes a polyethylene.

A multilayer film may be formed by any suitable technique including blown extrusion, cast extrusion, coextrusion, blow molding; casting, and extrusion blow molding. The materials forming each layer may be coextruded through a coextrusion feedblock and die assembly to yield a film with two or more layers coupled with each other (e.g., adhered together) but differing in composition. Coextrusion may be adapted to cast film or blown film processes. Multilayer films may also be formed by combining two or more single layer films prepared as described above. Oriented multilayer films of the present disclosure may be uniaxially oriented by stretching in a single direction (machine or transverse).

For example, the composition may be extruded in a molten state through an annular die and then blown and cooled to form a tubular, blown film, which can then be collapsed, the edges trimmed and each part of the bubble wound separately forming two multilayer films which are heated to a temperature under their melting points and stretched in the machine or the transverse direction. Alternatively, the composition may be extruded in a molten state through an annular die in a blown bubble, and the blown bubble collapsed, heated, stretched in the machine direction, annealed, and then cooled before trimming the edges and separating into two oriented multilayer films.

As a specific example, blown films can be prepared as follows. The polyethylene is introduced into the teed hopper of an extruder, such as a 50 mm extruder that is water-cooled, resistance heated, and has an L/D ratio of 30:1. The multilayer film can be produced using a 28 cm diameter W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 230° C. The rate of extrusion for a blown film is generally from about 0.5 to about 2 kilograms per hour per millimeter of die diameter. The finished film can be wound into rolls for later processing. A blown film process and apparatus suitable for forming films according to embodiments of the present disclosure is described in U.S. Pat. No. 5,569,693. Other blown film forming methods can also be used.

Once formed, multilayer films are then oriented in the direction of stretching (DS) to provide uniaxially oriented multilayer films. The orientation of blown films may occur after collapsing the bubble, and before separation of each half of the bubble. The oriented multilayer film can be oriented in the machine (or processing) direction (MD) or transverse direction (TD) using any suitable technique.

During orientation in any single direction, the multilayer film from the blown-film line or other film process is heated to an orientation temperature. Generally, the temperature range for orientation can be 25° C. below the Vicat softening temperature (as measured by ASTM D1525) up to the melting point (as measured ASTM D3418-03) of the polyethylene from which the outermost layers are comprised. The healing may be performed utilizing single or multiple heating rollers, or a heated space, such as an oven surrounding the material.

In one embodiment, the multilayer film may be oriented in the MD by feeding the heated multilayer film into a slow drawing roll with a nip roller, which has the same rolling speed as the heating rollers. The film then enters a fast drawing roll. The fast drawing roll has a speed that is 1.5 to 10 times faster than the slow draw roll, which effectively orients the film on a continuous basis. In at least one embodiment, the MD orientation is performed on a collapsed bubble, where the collapsed bubble is passed over heating rollers, then a fast drawing roller, an annealing roller or rollers and then separated to form two oriented multilayer films.

An oriented multilayer film is said to be at maximum extension when tensile strength in the direction of stretching (DS) has a less than 100% elongation at break under ASTM D-882. The preparation process of a uniaxially oriented in DS multilayer film includes forming an unoriented multi-layered film and stretching the multilayer film in a draw ratio of 1:3 up to 1:10, 1:4 to 1:9, or 1:5 to 1:8. The multilayer film is stretched at least 3 times its original length in a specific direction; this is stated herein as a draw ratio of at least 1:3, where "1" represents the original length of the film and "3" denotes that it has been stretched to 3 times that original length.

An effect of stretching is that the thickness of the oriented multilayer film is similarly reduced. Thus a draw ratio of at least 1:3 also means that the thickness of the oriented multilayer film is one-third of the original thickness or less.

In at least one embodiment, the oriented multilayer film may enter annealing thermal rollers, which allow stress relaxation by holding the film at an elevated temperature for a period of time. The annealing temperature may be of the same temperature range as used for stretching or slightly below (e.g. 10° C. to 20° C. below), with room temperature being the lower limit. The film may be cooled through cooling rollers, or a cooling chamber to an ambient temperature.

The stretching of the multilayer film may provide a film that is further down-gauged in comparison to known PE blown films (oriented or non-oriented), while simultaneously improving or at least maintaining tensile modulus and also maintaining the balance between optical properties and mechanical properties.

Laminates

A laminate includes a sealant film disposed on an oriented multilayer film of the present disclosure. The sealant film may include one or more layers of a polyethylene polymer. The sealant film can include a first layer, a second layer disposed on the first layer, and a third layer disposed on the second layer. Each of the first layer, the second layer, and the third layer includes a polyethylene polymer, optionally mixed with a second or third polyethylene polymer or other polymers or additives.

A sealant film may have a 1/2/3 structure where 1 is a first layer, 2 is a second layer, and 3 is a third layer (e.g. a sealant layer) disposed on an oriented multilayer film. The second layer is disposed between the first layer and the third layer. The first layer can be an outermost layer forming a film laminate surface. The composition of the polyethylene of the first layer and the polyethylene of the second layer may be the same or different. Either of the polyethylene of the first layer and the polyethylene of the second layer may have a higher or lower density than that of the polyethylene of the third layer. In at least one embodiment, at least one of the polyethylenes of the first layer and the second layer has a density higher than that of the polyethylene of the third layer. In another embodiment, the polyethylene of the second layer has the highest density of the layers in the sealant film.

In at least one embodiment, a sealant film includes in at least one layer at least one of LLDPE, LIRE and HDPE (as a polyethylene defined herein). In another embodiment, a sealant film includes in at least one layer 100 wt % of an EH copolymer, based on total weight of polymer in the layer.

In another embodiment, the LLDPE, LDPE, and HDPE present in a given layer of the sealant film may be part of a polyethylene composition, as defined herein. In at least one embodiment, the polyethylene compositions described may be physical blends or in situ blends of more than one type of polyethylene or compositions of polyethylenes with polymers other than polyethylenes. In some embodiments, the polyethylene composition is a blend of two polyethylenes with different densities.

In another embodiment, the polyethylene composition is an EAO copolymer blended with a second polyethylene. In at least one embodiment, the EAO polymer is an EH copolymer. The second polyethylene may be a homopolymer or a copolymer different from the EAO copolymer. In an embodiment where the polyethylene composition is a homopolymer:copolymer blend, the polyethylene homopolymer in the blend may be present in an amount of about 50 wt % or less, about 45 wt % or less, about 40 wt % or less, about 35 wt % or less, about 30 wt % or less, about 25 wt % or less, about 20 wt % or less, about 15 wt % or less, about 10 wt % or less, or about 5 wt % or less, based on the total weight of polymer in the polyethylene composition.

In at least one embodiment, a sealant film includes in each of the first layer and the third layer 100 wt % of an polyethylene copolymer, based on total weight of polymer in the first layer and the third layer. In at least one embodiment, the polyethylene copolymer is an EH copolymer.

In at least one embodiment, the polyethylene in the second layer of the sealant film includes a polyethylene composition having a density of about 0.91 g/cm$^3$ to about 098 g/cm$^3$, an MI, I2.16, of about 0.1 g/10 min to about 15 g/10 min, an MWD of about 1.5 to about 5.5, and an MIR, $I_{21.6}/I_{2.16}$, of about 10 to about 100.

In at least one embodiment, at least one of LLDPE, LDPE, and HDPE is present in the second layer, and the polyethylene present in the first layer and/or the third layer is an EH copolymer.

In at least one embodiment, the sealant film has a three-layer 1/2/3 structure, including: (i) the first layer including 100 wt % of an EAO copolymer, based on total weight of polymer in the outer layer, where the EAO copolymer has a density of about 0.910 g/cm$^3$ to about 0.945 g/cm$^3$, and an MI ($I_{2.16}$) of about 0.1 g/10 min to about 15 g/10 min; (ii) a second layer disposed on the first layer, the second layer including a polyethylene composition of about 60 wt % of an LAO copolymer, based on total weight of polymer in the second layer, where the EAO copolymer has a density of about 0.910 g/cm$^3$ to about 0.945 g/cm$^3$, and an MI ($I_{2.16}$) of about 0.1 g/10 min to about 15 g/10 min; and about 40 wt % of an HDPE, based on total weight of polymer in the second layer, where the HDPE has a density of about 0.94 g/cm$^3$ or greater, and an MI ($I_{2.16}$), of about 0.1 g/10 min to about 15 g/10 min; and (iii) a third layer disposed on the second layer, the third layer including 100 wt % of an EAO copolymer, based on total weight of polymer in the outer layer, where the EAO copolymer has a density of about 0910 g/cm$^3$ to about 0.945 g/cm$^3$, and an MI ($I_{2.16}$) of about 0.1 g/10 min to about 15 g/10 min.

In another embodiment, the sealant film has a three-layer 1/2/3 structure, including: (i) the first layer including an EH copolymer, where the EH copolymer has a density of about 0.91 g/cm$^3$ to about 0.92 g/cm$^3$, and an MI ($I_{2.46}$) of about 0.1 g/10 min to about 2 g/10 min; (ii) a second layer disposed on the first layer, the second layer including a polyethylene composition of an EH copolymer having a density of about 0.91 g/cm$^3$ to about 0.92 g/cm$^3$, and an MI ($I_{2.16}$) of about 0.1 g/10 min to about 2 g/10 min, and an HDPE having a density of about 0.96 g/cm$^3$ or greater, and an MI ($I_{2.16}$) of about 0.1 g/10 min to about 2 g/1.0 min; and (iii) a third layer including an EH copolymer having a density of about 0.91 g/cm$^3$ to about 0.92 g/cm$^3$, and an MI ($I_{2.16}$) of about 0.1 g/10 min to about 2 g/10 min.

In another embodiment where the sealant film includes in the second layer at least one of LLDPE, LOPE, and HOPE, the LLDPE, LDPE, HOPE, or any combination thereof may be present in an amount of about 30 wt % or greater, for example, from about 30 wt %, about 35 wt %, about 40 wt %, about 45 wt %, about 50 wt %, about 55 wt %, about or 60 wt %, to about 70 wt %, about 75 wt %, about 80 wt %, about 85 wt %, about 90 wt %, about 95 wt %, or about 100 wt %, based on the total weight of polymer in the layer. Any of the polyethylenes of the first layer, or the second layer may have a higher or lower density than the polyethylene of the third layer. In at least one embodiment, at least one of the first layer or the second layer has a density higher than that of third layer.

For the sealant films of a three-layer structure, the first layer, the second layer, and the third layer may be of equal thickness or alternatively the second layer may be thicker than each of the first layer and the third layer. In at least one embodiment, a sealant film includes a first layer and a third layer which each independently form 10% to 35%, or 15% to 30% of the total final thickness of the 3-layered film, the second layer forming the remaining thickness, e.g. 30% to 80%, or 40% to 70% of the total final thickness of the 3-layered film. The total thickness of the film is 100%, thus the sum of the individual layers has to be 100%. In some embodiments, the first layer, the second layer, and the third layer are of equal thickness. The sealant film may further include additional layer(s), which may be any layer typically included in polymer films. For example, the additional layer(s) may be made from:

A. Polyolefins, Polyolefins include homopolymers or copolymers of $C_2$ to $C_{20}$ olefins, e.g., a copolymer of an α-olefin and another olefin or α-olefin (ethylene is defined to be an α-olefin). Some examples of polyolefins include homopolyethylene, homopolypropylene, propylene copolymerized with ethylene and/or butene, ethylene copolymerized with one or more of propylene, butene or hexene, and optional dienes. Other examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

B. Polar polymers. Polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Examples include polyesters, polyamides, ethylene vinyl acetate copolymers, and polyvinyl chloride.

C. Cationic polymers. Cationic polymers include polymers or copolymers of geminally disubstituted olefins, α-heteroatom olefins and/or styrenic monomers. Geminally disubstituted olefins include isobutylene, isopentene, isoheptene, isohexane, isooctene, isodecene, and isododecene. α-Heteroatom olefins include vinyl ether and vinyl carbazole. Styrenic monomers include styrene, alkyl styrene, para-alkyl styrene, α-methyl styrene, chloro-styrene, and bromo-para-methyl styrene. Examples of cationic polymers include butyl rubber, isobutylene copolymerized with para methyl styrene, polystyrene, and poly-α-methyl styrene.

D. Miscellaneous, Other layers can be paper, wood, cardboard, metal, metal foils (such as aluminum foil and tin foil), metallized surfaces, glass (including silicon oxide (SiOx) coatings applied by evaporating silicon oxide onto a film surface), fabric, spunbond fibers, and non-wovens (e.g., polypropylene spunbond fibers or non-wovens), and substrates coated with inks, dyes, pigments, and the like.

As an example, a sealant film can also include layers including materials such as ethylene vinyl alcohol (EVOH), polyamide (PA), poly vinylidene chloride (PVDC), or aluminium, so as to alter barrier performance for the film where appropriate.

Sealant films can include an oriented form (the form after the film has undergone stretching in a uniaxial direction) or a biaxially oriented form, both of which may be useful for laminating to oriented multilayer films of the present disclosure. An oriented sealant film and an oriented multilayer film need not be oriented in the same direction for lamination.

It has been discovered that the combination of EAO copolymers in layers of a sealant film may significantly improve the mechanical properties of a laminate film over previous films. For example, at a given overall film stiffness resulting from a predetermined overall film density, bag drop test non-breakage rate (method A or B) of the laminate film can be greatly strengthened by addition of EAO copolymers in the sealant film, while other mechanical properties, including dart impact, and tear strength, can remain at a comparable level or also improve. As a result, the laminate film can provide a convenient and cost-effective alternative to current options for film packages where well balanced overall film performance is expected. Another advantage to laminate films made primarily from ethylene is recyclability within a single collection stream.

Laminate Properties

Where applicable, the properties and descriptions below are intended to encompass measurements in both the direction of stretching (DS) and the direction perpendicular to the DS of the oriented multilayer film. Such measurements are reported separately, with the designation "DS" indicating a measurement in the direction of stretching, and "PS" indicating a measurement in the direction perpendicular to stretching, with respect to the oriented multilayer film.

Tensile properties of the laminates can be measured as specified by ASTM D882 with static weighing and a constant rate of grip separation. Since rectangular shaped test samples can be used, no additional extensometer is used to measure extension. The nominal width of the tested film sample is 15 mm and the initial distance between the grips is 50 mm. A pre-load of 0.1N was used to compensate for the so called TOE region at the origin of the stress-strain curve. The constant rate of separation of the grips is 5 mm/min upon reaching the pre-load, and 5 mm/min to measure 1% Secant modulus (up to 1% strain). The film samples may be tested in direction of stretching (DS) or in a direction perpendicular to stretching (PS).

Laminate films of the present disclosure may have one or more of the following properties:

(a) A 1% secant modulus in the DS of about 500 MPa or greater, from about 500 MPa to about 1500 MPa, from about 600 MPa to about 1200 MPa, from about 600 MPa to about 1000 MPa, from about 600 MPa to about 900 MPa, or from about 600 MPa to about 800 MPa, as determined by ASTM D882 where 1% Secant modulus is calculated by drawing a tangent through two well defined points on the stress-strain curve, the reported value corresponds to the stress at 1% strain (with x correction).

(b) An absolute modulus of about 30 N/mm or greater, about 35 N/mm or greater, about 40 N/mm or greater, about 45 N/mm or greater, or about 50 N/mm or greater, where the absolute modulus is calculated by multiplying (i) the 1% secant modulus in the direction of stretching of the oriented multilayer film before lamination, as determined by ASTM D882 by (ii) the thickness of the laminate in millimeters.

(c) A Tensile Strength at break in the direction of stretching of about 30 MPa or greater, about 33 MPa. or greater, about 36 MPa or greater, about 40 MPa or greater, or about 45 MPa. or greater, as determined by ASTM D638;

(d) A total thickness of from about 5 μm to about 200 μm, from about 10 μm to about 150 μm, or from about 20 μm to about 120 μm. The thickness of each of the first layer and the third layer may be at least 5% of the total thickness, or from about 10% to about 40%. The thickness ratio between one of the first layer or the third layer and the second layer may be about 1:1 to about 1:6, for example, about 1:1, about 1:2, about 1:3, or about 1:4;

(e) A dart drop impact strength of about 4 g/μm or greater, about 5 g/μm or greater, about 6 g/μm or greater, about 8 g/μm or greater, about 9 g/μm or greater, or about 10 g/μm or greater. For example, the dart drop can be from about 4 g/μm to about 11 g/μm, from about 4 g/μm to about 8 g/μm, from about 5 g/μm to about 9 g/μm, from about 6 g/μm to about 10 g/μm, or from about 9 g/μm to about 11 g/μm, as determined by ASTM D1709;

(f) An Elmendorf Tear Strength (tear resistance) in the direction of stretching of at about 2 g/μm or greater, about 3 g/μm or greater, about 4 g/μm or greater, or about 6 g/μm or greater. For example, the Elmendorf Tear strength in the direction of stretching can be from about 2 g/μm to about 15 g/μm, from about 2 g/μm to about 10 g/μm, from about 2 g/μm to about 6 g/μm, from about 3 g/μm to about 8 g/μm, or from about 4 g/μm to about 8 g/μm, as determined by ASTM D1922-06a, which measures the energy required to continue a pre-cut tear in the test sample, expressed in (g/μm). Samples were cut across the web using the constant radius tear die and were free of any visible defects (e.g., die lines, gels, etc.);

(g) A 1% Flexural Secant Modulus of from about 200 MPa to about 1000 MPa, from about 300 MPa to about 800 MPa, or from about 400 MPa to about 750 MPa, as determined based on ASTM D790A, where test specimen geometry is as specified under the ASTM D790 section "Molding Materials (Thermoplastics and Thermosets)," and the support span is 2 inches (5.08 cm);

In certain embodiments, the laminate film has at least two, at least three, at least four, or any number of the foregoing properties.

Sealant Film and Laminate Production

A sealant film may be formed by any suitable technique including blown extrusion, cast extrusion, coextrusion, blow molding, casting, and extrusion blow molding. The materials forming each layer may be coextruded through a coextrusion feedblock and die assembly to yield a film with two or more layers coupled with each other (e.g., adhered together) but differing in composition. Coextrusion may be adapted to cast film or blown film processes. Multiple layer sealant films may also be formed by combining two or more single layer films prepared as described above.

In at least one embodiment of the present disclosure, the sealant films may be formed by using any suitable blown film technique to form a blown film. For example, the polyethylenes can be extruded in a molten state through an annular die and then blown and cooled to form a tubular, blown film, which can then be collapsed, the edges trimmed and each part of the bubble wound separately forming two flat films. As a specific example, blown films can be prepared as follows. The polyethylene is introduced into the feed hopper of an extruder, such as a 50 mm extruder that is water-cooled, resistance heated, and has an L/D ratio of 30:1. The film can be produced using a 28 cm diameter W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, and optionally, subjected to a desired auxiliary process, such as slitting, treating, sealing, or printing. Typical melt temperatures are from about 180° C. to about 230° C. The rate of extrusion for a blown film is generally from about 0.5 to about 2 kilograms per hour per millimeter of die diameter. The finished film can be wound into rolls for later processing. A blown film process and apparatus suitable for forming films according to embodiments of the present disclosure is described in U.S. Pat. No. 5,569,693. Other blown film forming methods can also be used.

Once formed, sealant films are then laminated to an oriented multilayer film of the present disclosure. The lamination of polymer films may be accomplished through any suitable method, such as extrusion lamination, heat-sealing, wet lamination or adhesive lamination. Adhesive lamination is described in U.S. Pat. No. 3,623,944 or 5,545,475 incorporated by reference herein. Wet lamination is described in U.S. Pat. No. 5,755,913 incorporated by reference herein. Heat sealing may be accomplished by single or multiple heating rollers, as described in U.S. Pat. No. 5,626,944 or U.S. Patent Publication No. 2005/0158517 incorporated by reference herein; a heated space, such as an oven or coronal discharge area, as described in U.S. Pat. No. 4,008,352 or 4,432,820 incorporated by reference herein; heating by electric discharge, as described in U.S. Pat. No. 5,110,387 incorporated by reference herein; or any other suitable method. Extrusion lamination is described in U.S. Pat. No. 4,287,262, incorporated by reference herein.

Other embodiments of the present disclosure can include:

Paragraph 1. A oriented multilayer film including a first layer, a second layer disposed on the first layer, and a third layer disposed on the second layer, where the first layer and the third layer include a polyethylene independently selected from (i) a polyethylene having a density of about 0.94 g/cc or greater; (ii) a polyethylene copolymer including ethylene and a $C_4$-$C_{12}$ alpha-olefin and having a density from about 0.927 g/cc to about 0.95 g/cc; or (iii) a mixture thereof, and at least one of the first layer or the third layer includes the polyethylene copolymer, the second layer includes a polyethylene composition having a density of about 0.91 g/cc or greater and the oriented multilayer film has a haze of about 10% or less and a 1% secant modulus in the direction of stretching of about 500 MPa or greater.

Paragraph 2. The oriented multilayer film of paragraph 1, further including a fourth layer disposed between the first layer and the second layer.

Paragraph 3. The oriented multilayer film of paragraphs 1 or 2, further including a fifth layer disposed between the second layer and the third layer.

Paragraph 4. The oriented multilayer film of any of paragraphs 1 to 3, where the polyethylene of the first layer and the polyethylene of the third layer have substantially the same chemical composition.

Paragraph 5. The oriented multilayer film of paragraphs 3 or 4, where the polyethylene of the fourth layer and the polyethylene of the fifth layer have substantially the same chemical composition.

Paragraph 6. The oriented multilayer film of any of paragraphs 1 to 5, where the polyethylene copolymer has a g'vis of about 0.75 or greater, a MI of about 0.3 to about 10, and about 95 wt % or greater of polymer units derived from ethylene.

Paragraph 7. The oriented multilayer film of any of paragraphs 1 to 6, where the oriented multilayer film is substantially uniaxially oriented and has a thickness of about 5 μm to about 120 μm.

Paragraph 8. The oriented multilayer film of any of paragraphs 1 to 7, where the oriented multilayer film has a clarity of about 55% or greater.

Paragraph 9. The oriented multilayer film of any of paragraphs 1 to 8, where the oriented multilayer film has a gloss of about 60% or greater.

Paragraph 10. The oriented multilayer film of any of paragraphs 1 to 9, where the oriented multilayer film has an average tensile strength at break in the direction stretching of about 80 MPa or greater.

Paragraph 11. The oriented multilayer film of any of paragraphs 1 to 10, where the oriented multilayer film has a tear resistance in the direction of stretching of about 0.5 g/μm or greater.

Paragraph 12. The oriented multilayer film of any of paragraphs 3 to 11, where the thickness of the first layer and the third layers is less than the thickness of the second layer.

Paragraph 13. The oriented multilayer film of any of paragraphs 1 to 12, where the thickness of the fourth layer and the fifth layer is less than the thickness of the second.

Paragraph 14. A laminate including the oriented multilayer film of any of paragraphs 1 to 13 and a sealant film disposed on the oriented multilayer film, the sealant film comprising one or more layers comprising a polyethylene.

Paragraph 15. The laminate of paragraph 14, where the sealant film includes a first layer, a second layer, and a third layer, where the first layer, the second layer, and the third layer of the sealant film each include a polyethylene selected independently from (i) a polyethylene having a density of about 0.94 g/cc or greater; (ii) a polyethylene copolymer comprising ethylene and a $C_4$-$C_{12}$ alpha-olefin and having a density from about 0.91 g/cc to about 0.95 g/cc; or (iii) a mixture thereof.

Paragraph 16. The laminate of any of claims 14 to 15, wherein the laminate has a dart drop impact strength of about 4 g/μm or greater.

Paragraph 17. A method for preparing an oriented multilayer film including: extruding a first layer, a second layer disposed on the first layer, and a third layer disposed on the second layer, where the first layer and the third layer, include a polyethylene independently selected from (i) a polyethylene having a density greater than about 0.94 g/cc; (ii) a polyethylene copolymer including ethylene and a $C_4$-$C_{12}$ alpha-olefin having a density from about 0.927 g/cc to about 0.95 g/cc; or (iii) a mixture thereof, where at least one of the first layer or the third layer includes the polyethylene copolymer, the second layer includes a polyethylene composition having a density of about 0.91 g/cc or greater; and stretching the multilayer film in a uniaxial direction.

Paragraph 18. The method of paragraph 17, further including extruding a fourth layer disposed between the first layer and the second layer, where the fourth layer includes a polyethylene.

Paragraph 19. The method of any of paragraphs 17 or 18, further including extruding a fifth layer disposed between the second layer and the third layer, where the fifth layer includes a polyethylene.

Paragraph 20. The method of any of paragraphs 17 to 19, further including heating the multilayer film before stretching to an orientation temperature at or below the melting point of the first layer and the third layer.

Paragraph 21. The method of any of paragraphs 17 to 20, further including annealing the oriented multilayer film at a temperature above 25° C.

Paragraph 22. The method of any of paragraphs 17 to 21, where the polyethylene of the first layer and the polyethylene of the third layer have substantially the same chemical composition.

Paragraph 23. The method of any of paragraphs 19 to 22, where the polyethylene of the fourth layer and the polyethylene of the fifth layer have substantially the same chemical composition.

Paragraph 24. The method of any of paragraphs 17 to 23, where the stretching further includes stretching the multilayer film to a final thickness of about 5 μm to about 120 μm.

Paragraph 25. The method of any of paragraphs 17 to 24, where the stretching further includes stretching the multilayer film in the machine direction with a draw ratio of about 1:3 to about 1:10.

Paragraph 26. The method of any of paragraphs 17 to 25, further comprising laminating the oriented multilayer film to a sealant film including one or more layers including polyethylene.

Paragraph 27. The method of paragraph 26, where the laminate exhibits a tear resistance in the stretching direction of about 2 g/μm or greater.

Paragraph 28. The method of any of paragraphs 26 to 27, where the laminate has a dart drop impact strength of about 4 g/μm or greater.

EXAMPLES

The properties cited below were determined in accordance with the following test procedures. Where any of these properties is referenced in the appended claims, it is to be measured in accordance with the specified test procedure.

The density was measured according to ISO 1183 and ISO 1872-2 for sample preparation.

Haze, reported as a percentage (%), was measured as specified by ASTM D-1003 and is defined as the percentage of transmitted light passing through the bulk of the film sample that is deflected by more than 2.5°. Total transmittance is a measurement of how much light passes through a film (ratio of total transmitted light to incident light). The haze is the ratio in % of the diffused light relative to the total light transmitted by the sample film.

Example 1. An oriented multilayer film of five layers was produced on an Alpine blown line equipped with a 400 mm die diameter, a 2 mm die gap, and IBC. The production was made at an output of 340 kg/h, with cooling air at 15° C. and a blow-up ratio (BUR) of 1:2.42. The first layer was formed from Enable™ 4002HH (which is an EH copolymer with a density of 0.940 g/cm$^3$, and a MI (190° C./2.16 kg) of 0.25 g/10 min). The second layer was formed from Exceed™ XP 8656 (which is an EH copolymer with density of 0.916 g/cm$^3$, and an MI (190° C./2.16 kg) of 0.5 g/10 min. The third layer was formed from a 97:1:2 (by weight) blend of Enable™ 4002HH, Polybatch CE-505-E and A Schulman Polybatch F15 antiblock masterbatch. The fourth layer was formed from HTA 108 (an HDPE with a density of 0.961 g/cm$^3$, and a MI (190° C./2.16 kg) of 0.70 g/10 min), The fifth layer formed from a 99.5:0.5 (by weight) blend of HTA 108 (an HDPE with a density of 0.961 g/cm$^3$, and a MI (190° C./2.16 kg) of 0.70 g/10 min) and A. Schulman Polybatch CE-505-E slip masterbatch. The fourth layer was disposed between the first and second layers, and the fifth layer was disposed between the second and third layers. The multilayer film had a layer distribution of 1/1/2/1/1, the first layer, the third layer, the fourth layer, and the fifth layer having the same thickness, and the second layer being twice as thick as the other layers. The multilayer film underwent machine direction stretching as follows: The blown bubble was collapsed and the edges trimmed forming two separated multilayer film which were stretched together. The two multilayer films were rolled across four pre-heating rollers at temperatures of 105° C., 110° C., 112° C., and 112° C., in that order, then across two stretching rollers both at 112° C., but turning at different rates so that the films were stretched in a 1:4.6 ratio to a final individual multilayer film thickness of 25 μm. The oriented multilayer films were annealed and cooled by passing over two annealing rollers at temperatures of 110° C. and 105° C., and then across two cooling rollers at temperatures of 70° C. and 40 C. The two multilayer films were then separated without any problem that might arise from blocking. After corona treatment of the first layer, the oriented multilayer film was laminated to a sealant film. The sealant film had a first layer including Exceed™ XP 8784ML (which is an EH copolymer with a density of 0.914 g/cm$^3$, and a MI (190° C./2.16 kg) of 0.8 g/10 min), the second layer including a 69.5:30:0.5 (by weight) blend of Exceed™ XP 8784ML, HTA 108, and A Schulman Polybatch CE-505-E slip masterbatch. The third layer (the sealant layer) including a 98.5:1:0.5 blends of Exceed™ 1012HA (which is an EH copolymer with a density of 0.912 g/cm$^3$, and a MI (190° C./2.16 kg) of 1.0 g/10 min), Polybatch CE-505-E and A Schulman Polybatch F15 antiblock masterbatch. The sealant film had a thickness of 120 μm and a layer distribution of 1/2/1, the second layer being twice as thick as the first layer and the third layer. The oriented multilayer film had a haze of 6.2% and a gloss of 81%, and an absolute modulus of 32 N/mm. The laminate had a 100% non-breakage rate for the drop test performance method B and an absolute modulus of 74 N/mm.

Example 2. An oriented multilayer film of five layers was produced on a W&H Varex blown line equipped with a 280 mm die diameter, a 1.4 mm die gap, a dual-orifice cooling ring and IBC. The production was made at an output of 305 kg/h, with cooling air at 15° C. and a blow-up ratio (BUR) of 1:31 The first layer was formed from Enable™ 4002HH, The second layer was formed from a 99:1 (by weight) blend of Exceed™ XP 8656ML and Polybatch CE-505-E. The third layer was formed from a 96.4:1.6:2.0 (by weight) blend of Enable™ 4002HH, Polybatch CE-505-E and Polybatch F15. The fourth layer was formed from an HTA108, The fifth layer was formed from a 96.4:1.6:2.0 (by weight) blend of HTA 108, Polybatch CE-505-E and Polybatch F15. The fourth layer was disposed between the first and second layers, and the fifth layer was disposed between the second and third layers. The multilayer film had a gauge of 125 μm and a layer distribution of 1/2/4/2/1, the fourth layer and the fifth layer being twice as thick as the first layer and the third layer, and the second layer being four times as thick as the first layer and the third layer. The multilayer film underwent machine direction stretching as follows: The blown bubble was collapsed and the edges trimmed forming two separated multilayer film which were separated before stretching. A single multilayer film was rolled across four pre-heating rollers at temperatures of 105° C., 120° C. 120° C., and 120°

C., in that order, then across two stretching rollers both at 120° C., but turning at different rates so that the film was stretched in a 1:5 ratio to a final film thickness of 25 μm. The oriented multilayer film was annealed and cooled by passing over two annealing rollers at temperatures of 110° C. and 100° C., and then across two cooling rollers at temperatures of 60° C. and 30 C. After corona treatment of the first layer, the oriented multilayer film was laminated to a sealant film. The sealant film had a first layer including Exceed™ XP 8656ML, the second layer including a 60:40 (by weight) blend of Exceed™ XP 8656ML and HTA 108, and the third layer (the sealant layer) including Exceed™ 1012HA. The sealant film had a thickness of 80 μm and a layer distribution of 1/2/1, the second layer being twice as thick as the first layer and the third layer. The oriented multilayer film had a haze of 6.28% and an absolute modulus of 34.6 N/mm. The laminate had a 100% non-breakage rate for the drop test performance method A and an absolute modulus of 60 N/mm.

Example 3. An oriented multilayer film of three layers was produced on a W&H Varex blown line equipped with a 280 mm die diameter, a 1.4 mm die gap, a dual-orifice cooling ring and IBC. The production was made at an output of 305 kg/h, with cooling air at 15° C. and a blow-up ratio (BUR) of 1:3.1. The first layer was formed from Enable™ 4002H (which is an EH copolymer with a density of 0.940 g/cm$^3$, and a MI (190° C./2.16 kg) of 0.25 g/10 min). The second layer was formed from a 59:40:1 (by weight) blend of Exceed™ XP 8656ML (which is an EH copolymer with a density of 0.916 g/cm$^3$, and a MI (190° C./2.16 kg) of 0.50 g/10 min), HTA 108 (an HDPE with a density of 0.961 g/cm$^3$, and a MI (190° C./2.16 kg) of 0.70 g/10 min) and A. Schuhnan Poly batch CE-505-E slip masterbatch. The third layer was formed from a 96.4:1.6:2.0 (by weight) blend of Enable™ 4002HH, Polybatch CE-505-E and A Schulman Polybatch F15 antiblock masterbatch. The film had a gauge of 125 μm and a layer distribution of 1/3/1, the second layer being three times as thick as the first layer and the third layer. The multilayer film underwent machine direction stretching on an Alpine MDO unit as follows: The blown bubble was collapsed and the edges trimmed forming two separated multilayer film which were separated before stretching. A single multilayer film was rolled across four pre-heating rollers at temperatures of 105° C., 118° C., 118° C., and 118° C., in that order, then across two stretching rollers both at 115° C., but turning at different rates so that the film was stretched in a 1:5 ratio to a final film thickness of 25 μm. The oriented multilayer film was annealed and cooled by passing over two annealing rollers at temperatures of 110° C. and 100° C., and then across two cooling rollers at temperatures of 60° C. and 30 C. After corona treatment of the first layer, the oriented multilayer film was laminated to a sealant film. The sealant film had a first layer including Exceed™ XP 8656ML, the second layer including a 60:40 (by weight) blend of Exceed™ XP 8656ML and HTA 108 (which is an HDPE with a density of 0.961 g/cm$^3$, and a MI (190° C./2.16 kg) of 070 g/10 min), and the third layer (the sealant layer) included Exceed™ 1012HA (which is an EH copolymer with a density of 0.912 g/cm$^3$, and a MI (190° C./2.16 kg) of 1 g/10 min). The sealant film had a thickness of 80 μm and a layer distribution of 1/2/1, the second layer being twice as thick as the first layer and the third layer. The oriented multilayer film had a haze of 6% and an absolute modulus of 25 N/mm. The final laminated structure ("the laminate") had a non-breakage rate for drop test performance method A of 0% and an absolute modulus of 52 N/mm. Without being limited by theory, the low non-breakage rate for the drop test performance method A may arise from the blend of Exceed XP 8656 and HTA 108 in the core layer and be unrelated to the Enable 4002 in the outer layers.

Example 4. An oriented multilayer film of three layers was produced on a W&H Varex blown line equipped with a 280 mm die diameter, a 1.4 mm die gap, a dual-orifice cooling ring and IBC. The production was made at an output of 305 kg/h, with cooling air at 15° C. and a blow-up ratio (BUR) of 1:3.1. The first layer was formed from HTA 108, an HDPE with a density of 0.961 g/cm$^3$, and a MI (190° C./2.16 kg) of 070 g/10 min. The second layer was formed from a 79:20:1 (by weight) blend of Exceed™ XP 8656ML, Enable™ 2005HH (which is an EH copolymer with a density of 0.92 g/cm$^3$, and a MI (190° C./2.16 kg) of 0.25 g/10 min) and Polybatch CE-505-E. The third layer was formed from a 96.4:1.6:2.0 (by weight) blend of HTA108, Poly batch CE-505-E and Polybatch F15. The film had a gauge of 125 μm and a layer distribution of 1/3/1, the second layer being three times as thick as the first layer and the third layer. The multilayer film underwent machine direction stretching on an Alpine MDO unit as follows: The blown bubble was collapsed and the edges trimmed forming two separated multilayer film which were separated before stretching. A single multilayer film was rolled across four pre-heating rollers at temperatures of 103° C., 116° C., 116° C., and 116° C., in that order, then across two stretching rollers both at 11.3° C., but turning at different rates so that the film was stretched in a 1:5 ratio to a final film thickness of 25 μm. The oriented multilayer film was annealed and cooled by passing over two annealing rollers at temperatures of 110° C. and 100° C., and then across two cooling rollers at temperatures of 60° C. and 30 C. After corona treatment of the first layer, the oriented multilayer film was laminated to a sealant film. The sealant film had a first layer including Exceed™ XP 8656ML, a second layer including a 60:40 (by weight) blend of Exceed™ XP 8656ML and HTA 108, and a third layer (the sealant layer) including Exceed™ 1012HA. The sealant film had a thickness of 80 μm and a layer distribution of 1/2/1, the second layer being twice as thick as the first layer and the third layer. The oriented multilayer film had a haze of 11.4% and an absolute modulus of 32.2 N/mm. The laminated structure ("the laminate") a 33% non-breakage rate for the drop test performance method and an absolute modulus of 57 N/mm.

FIG. 1 is a graph comparing the percent haze and absolute modulus of various oriented multilayer films including: (i) a five-layer machine direction oriented multilayer film according to example 1 having a haze of 6.2% and an absolute modulus of 32 N/mm; (ii) a five-layer machine direction oriented multilayer film according to example 2 having a haze of 6.28% and an absolute modulus of 34.6 N/mm; (iii) a three layer machine direction oriented multilayer film with Enable™ 4002 in the outer layers according to example 3 having a haze of 6% and an absolute modulus of 25 N/mm; (iv) a three layer machine direction oriented multilayer film with a HDPE in the outer layers according to example 4 having a haze of 11.4% and an absolute modulus of 32.2 N/mm; (v) an oriented polyethylene terephthalate film having a haze of 2.98% and an absolute modulus of 50.3 N/mm; (vi) a biaxially oriented polypropylene film having a haze of 3.18% and an absolute modulus of 37.4 N/mm; and (vii) a biaxially oriented polyamide film having a haze of 4.26% and an absolute modulus of 35.4 N/mm.

Figure 2:
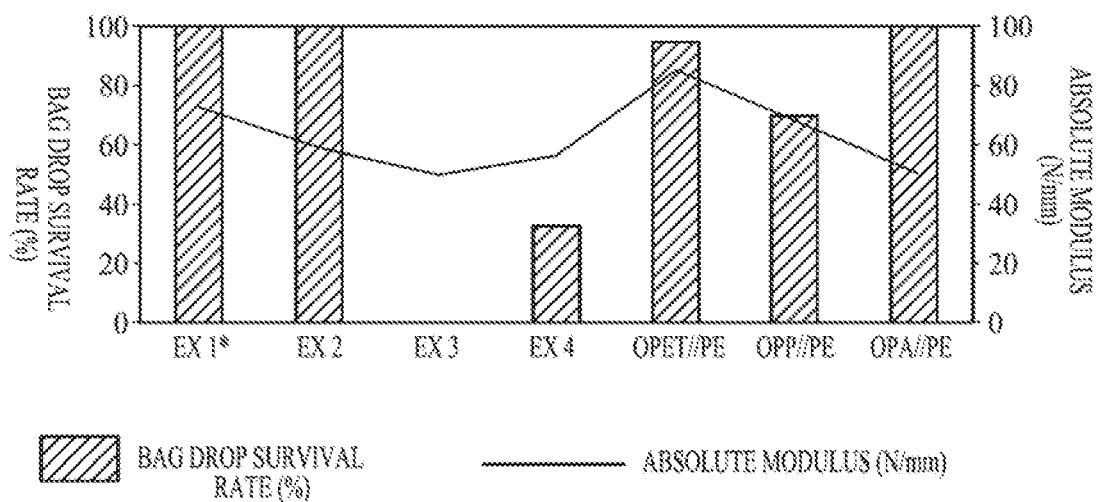
FIG. 2 is a graph comparing bag drop survival rate (or non-breakage rate) and absolute modulus of various laminates, according to one embodiment.

FIG. 2 is a graph comparing bag drop survival rate (or non-breakage rate) and absolute modulus of various laminates comprising multilayer films. The multilayer films include: (i) a five-layer machine direction oriented multilayer film according to example 1; the laminate having a non-breakage rate of 100% (drop test performance method B) and an absolute modulus of 74 N/mm; (ii) a five-layer machine direction oriented multilayer film according to example 2; the laminate having a non-breakage rate of 100% (drop test performance method A) and an absolute modulus of 60 N/mm; (iii) a three layer machine direction oriented multilayer film with Enable™ 4002 in the outer layers according to example 3; the laminate having a non-breakage rate of 0% (drop test performance method A) and an absolute modulus of 52 N/mm; (iv) a three layer machine direction oriented multilayer film with a HDPE in the outer layers according to example 4; the laminate having a non-breakage rate of 33% (drop test performance method A) and an absolute modulus of 57 N/mm; (v) an oriented polyethylene terephthalate film; the laminate thereof having a non-breakage rate of 95% (drop test performance method A) and an absolute modulus of 85 N/mm; (vi) a biaxially oriented polypropylene film; the laminate thereof having a non-breakage rate of 70% (drop test performance method A) and an absolute modulus of 68 N/mm; and (vii) a biaxially oriented polyamide film; the laminate thereof having a non-breakage rate of 100% (drop test performance method A) and an absolute modulus of 51 N/mm. The sealant film for each of the polyethylene terephthalate film, the polypropylene film; and the polyamide film were the same as the sealant layer for the multilayer film substrates of examples 2-4.

Overall, multilayer films and laminates of the present disclosure can be composed substantially of polyethylene, and can therefore be recyclable, and have desired physical and optical properties. For example, example 2, a five-layer substantially polyethylene laminate had a 100% non-breakage rate (drop test performance method A), and haze value comparable to that of oriented PET, PP, or Nylons. The addition of certain EAO copolymers or certain EH copolymers to the outer layers and directional orientation of the multilayer films can avoid issues with blocking and provide films with low haze, high gloss and clarity, without sacrificing tensile strength, tear resistance, and recyclability.

For the sake of brevity, only certain ranges are explicitly disclosed herein. However, ranges from any lower value may be combined with any upper value to recite a range not explicitly recited, as well as, ranges from any lower value may be combined with any other lower value to recite a range not explicitly recited, in the same way, ranges from any upper value may be combined with any other upper value to recite a range not explicitly recited. Additionally, within a range includes every point or individual value between its end points even though not explicitly recited. Thus, every point or individual value may serve as its own lower or upper value combined with any other point or individual value or any other lower or upper value, to recite a range not explicitly recited.

It is to be understood that while aspects of the present disclosure have been described in conjunction with specific embodiments thereof, the foregoing description is intended to illustrate and not limit the scope of the claims. Other aspects, advantages and modifications will be apparent to those skilled in the art to which the present disclosure pertains.

What is claimed is:

1. An oriented multilayer film comprising:
   a first layer;
   a second layer disposed on the first layer; and
   a third layer disposed on the second layer;
   wherein:
   the first layer and the third layer comprise a polyethylene independently selected from (i) a polyethylene having a density of about 0.94 g/cc or greater; (ii) a polyethylene copolymer comprising ethylene and a $C_4$-$C_{12}$ alpha-olefin and having a density from about 0.927 g/cc to about 0.95 g/cc; or (iii) a mixture thereof, and at least one of the first layer or the third layer comprises the polyethylene copolymer, wherein the first layer and the third layer are the outer layers of the orientated multilayer film, and wherein the polyethylene has a Mz/Mw ratio of 1.5 or greater;
   the second layer comprises a polyethylene composition having a density of about 0.91 g/cc or greater, and
   the oriented multilayer film has a haze of about 10% or less and a 1% tensile secant modulus in the machine direction of stretching of about 500 MPa or greater, as determined by ASTM D882.

2. The oriented multilayer film of claim 1, further comprising a fourth layer disposed between the first layer and the second layer comprised of a polyethylene.

3. The oriented multilayer film of claim 2, further comprising a fifth layer disposed between the second layer and the third layer comprised of a polyethylene.

4. The oriented multilayer film of claim 1, wherein the polyethylene of the first layer and the polyethylene of the third layer have the same chemical composition.

5. The oriented multilayer film of claim 3, wherein the polyethylene of the fourth layer and the polyethylene of the fifth layer have substantially the same chemical composition.

6. The oriented multilayer film of claim 1, wherein the polyethylene copolymer has a $g'_{vis}$ of about 0.75 or greater, as measured using gel permeation chromatography, a MI of about 0.3 to about 10, and about 95 wt % or greater of polymer units derived from ethylene.

7. The oriented multilayer film of claim 1, wherein the oriented multilayer film is substantially uniaxially oriented and has a thickness of about 5 µm to about 120 µm.

8. The oriented multilayer film of claim 1, wherein the oriented multilayer film has one or more of the following properties:
   (a) a clarity of about 55% or greater, as determined by ASTM D1746;
   (b) a gloss of about 60% or greater, as determined by ASTM D-2457;
   (c) an average tensile strength at break in the direction of stretching of about 80 MPa or greater, as determined by ASTM D638; and
   (d) a tear resistance in the direction of stretching of about 0.5 g/µm or greater, as determined by ASTM D1922-06a.

9. The oriented multilayer film of claim 1, wherein the thickness of each of the first layer and the third layer is less than the thickness of the second layer.

10. The oriented multilayer film of claim 3, wherein the individual thickness of the fourth layer and the fifth layer is less than the thickness of the second layer.

11. A laminate comprising the oriented multilayer film of claim 1 and a sealant film disposed on the oriented multilayer film, the sealant film comprising a one or more layers comprising polyethylene.

12. The laminate of claim 11, wherein the sealant film comprises a first layer, a second layer, and a third layer, wherein the first layer, the second layer, and the third layer of the sealant film each comprise a polyethylene selected independently from (i) a polyethylene having a density of about 0.94 g/cc or greater; (ii) a polyethylene copolymer comprising ethylene and a $C_4$-$C_{12}$ alpha-olefin and having a density from about 0.91 g/cc to about 0.95 g/cc; or (iii) a mixture thereof.

13. The laminate of claim 11, wherein the laminate has a dart drop impact strength of about 4 g/μm or greater, as determined by ASTM D1709.

14. A method for preparing an oriented multilayer film comprising:

extruding a first layer, a second layer disposed on the first layer, and a third layer disposed on the second layer forming a multilayer film, wherein the first layer and the third layer, comprise a polyethylene independently selected from (i) a polyethylene having a density greater than about 0.94 g/cc; (ii) a polyethylene copolymer comprising ethylene and a $C_4$-$C_{12}$ alpha-olefin having a density from about 0.927 g/cc to about 0.95 g/cc; or (iii) a mixture thereof, wherein at least one of the first layer or the third layer comprises the polyethylene copolymer, wherein the second layer comprises a polyethylene composition having a density of about 0.91 g/cc or greater, wherein the first layer and the third layer are the outer layers of the prepared multilayers of the prepared multilayer film, forming a multilayer film, and wherein the polyethylene has a Mz/Mw ratio of 1.5 or greater; and stretching the multilayer film in a uniaxial direction.

15. The method of claim 14, further comprising extruding a fourth layer disposed between the first layer and the second layer, wherein the fourth layer comprises a polyethylene.

16. The method of claim 15, further comprising extruding a fifth layer disposed between the second layer and the third layer, wherein the fifth layer comprises a polyethylene.

17. The method of claim 14, further comprising heating the multilayer film before stretching to an orientation temperature at or below the melting point of the first layer and the third layer.

18. The method of claim 14, further comprising annealing the oriented multilayer film at a temperature above 25° C.

19. The method of claim 14, wherein the polyethylene of the first layer and the polyethylene of the third layer have the same chemical composition.

20. The method of claim 14, further comprising laminating the oriented multilayer film to a sealant film comprising a one or more layers comprising polyethylene.

* * * * *